(12) United States Patent
Zhou

(10) Patent No.: US 12,390,979 B2
(45) Date of Patent: Aug. 19, 2025

(54) FILM APPLICATOR, A STICKING FILM AND A FILM-STICKING ASSEMBLY

(71) Applicant: Dongguan Pineapple Protection Co., Ltd., Dongguan (CN)

(72) Inventor: Shengjie Zhou, Dongguan (CN)

(73) Assignee: Dongguan Pineapple Protection Co., Ltd., Dongguan (CN)

(*) Notice: Subject to any disclaimer, the term of this patent is extended or adjusted under 35 U.S.C. 154(b) by 0 days.

(21) Appl. No.: 17/878,934

(22) Filed: Aug. 2, 2022

(65) Prior Publication Data

US 2023/0330916 A1 Oct. 19, 2023

(30) Foreign Application Priority Data

Apr. 13, 2022 (CN) .......................... 202220850731.5
Apr. 13, 2022 (CN) .......................... 202220854659.3
(Continued)

(51) Int. Cl.
 *B29C 63/00* (2006.01)
 *B29C 63/02* (2006.01)
 *B29L 31/34* (2006.01)

(52) U.S. Cl.
 CPC .......... *B29C 63/0004* (2013.01); *B29C 63/02* (2013.01); *B29L 2031/34* (2013.01)

(58) Field of Classification Search
 CPC ......... H04M 1/02; C09J 7/00; B29C 63/0004; B29C 63/02
 See application file for complete search history.

(56) References Cited

U.S. PATENT DOCUMENTS

| 9,481,159 B2 | 11/2016 | Wang | |
|---|---|---|---|
| 2013/0020005 A1* | 1/2013 | Koblick | B29C 63/0047 156/60 |

(Continued)

FOREIGN PATENT DOCUMENTS

| CN | 203958684 U | | 11/2014 |
|---|---|---|---|
| CN | 204161653 U | * | 2/2015 |

(Continued)

OTHER PUBLICATIONS

Shawease Inc. website: Mobile phone toughened glass protective film features https://shawease.com/mobile-phone-toughened-glass-protective-film-features/ (Year: 2022).*

(Continued)

*Primary Examiner* — Abbas Rashid
*Assistant Examiner* — Wayne K. Swier
(74) *Attorney, Agent, or Firm* — Andrew C. Cheng

(57) ABSTRACT

The present disclosure relates to the technical field of film sticking, more particularly to a film applicator, a sticking film and a film-sticking assembly. The film applicator includes a main body portion, a pulling opening and a fixing portion. When using, the electronic product is positioned at the mounting slot and the sticking film is positioned on the fixing portion, the pulling portion is positioned between the screen and the release film layer, with a gap existed therebetween. The free end of the pulling portion is pulled to separate the release film layer and the tempered film to make the side with static electricity to attract the dust on the screen. By configuring the film applicator with the electrostatic layer, steps of pasting and dust removal are almost simultaneously carried out, and the sticking film is limited to a small space to prevent impurities and improve pasting quality.

16 Claims, 22 Drawing Sheets

(30) Foreign Application Priority Data

May 16, 2022 (CN) .......................... 202221177877.4
Jun. 20, 2022 (CN) .......................... 202221551563.6

(56) References Cited

U.S. PATENT DOCUMENTS

| | | | | |
|---|---|---|---|---|
| 2013/0083395 | A1* | 4/2013 | Liu | G02B 1/105 |
| | | | | 359/507 |
| 2017/0253014 | A1* | 9/2017 | Kleeman | B32B 7/12 |
| 2017/0313036 | A1* | 11/2017 | Lin | H04M 1/0266 |
| 2021/0252770 | A1* | 8/2021 | Lee | B29C 63/0004 |

FOREIGN PATENT DOCUMENTS

| | | | | |
|---|---|---|---|---|
| CN | 204750661 | U | | 11/2015 |
| CN | 204979717 | U * | | 1/2016 |
| CN | 105766077 | A | | 7/2016 |
| CN | 109822880 | A | | 5/2019 |
| CN | 209506199 | U | | 10/2019 |
| CN | 210733278 | U | | 6/2020 |
| CN | 210942430 | U | | 7/2020 |
| CN | 212242129 | U | | 12/2020 |
| CN | 112793145 | A | | 5/2021 |
| CN | 213109932 | U | | 5/2021 |
| CN | 113428401 | A | | 9/2021 |
| CN | 214190291 | U | | 9/2021 |
| WO | WO-2015038883 | A1 * | 3/2015 | ......... B29C 63/0004 |
| WO | WO-2015054692 | A1 * | 4/2015 | ......... B29C 63/0004 |

OTHER PUBLICATIONS

Machine translation CN204979717U (Year: 2016).*
Machine translation CN2014161653U (Year: 2015).*
Machine translation CN109822880A (Year: 2019).*
Machine translation CN113428401A (Year: 2021).*
Machine translation CN214190291U (Year: 2021).*

* cited by examiner

FILM APPLICATOR, A STICKING FILM AND A FILM-STICKING ASSEMBLY

TECHNICAL FIELD

The present disclosure relates to the field of film sticking technology, and more particularly to a film applicator, a sticking film and a film-sticking assembly.

BACKGROUND

With the continuous development and innovation of science and technology, electronic products have become an indispensable part of people's lives. When using electronic products, in order to prevent the screen of the electronic product from being scratched and broken, a layer of tempered film is attached to the screen of the electronic product. Most of the existing films include tempered film and release film layer. In order to obtain a better film effect, a film applicator is usually required to assist the film. The process of sticking the film generally includes: before sticking the film, clean the fine dust, stains, fingerprints and other pollutants on the screen, tear off the release film layer, and then attach the tempered film to the screen. In the existing film applicator, usually, the steps of cleaning, tearing off the film and sticking the film need to be carried out separately, and the consistency of the film sticking process is poor, resulting in poor film sticking effect.

SUMMARY

In order to overcome the defects of poor consistency of the film sticking process during the current film sticking, resulting in poor film sticking effect, the present disclosure provides a film applicator, a sticking film and a film-sticking assembly.

In order to solve the above technical problems, the present disclosure provides a film applicator, which is used to cooperate with a sticking film to stick on an electronic product. The sticking film includes a tempered film, a release film layer and a pulling portion. The tempered film has a sticking surface for sticking with the screen of the electronic product, the release film layer is attached to the sticking surface of the tempered film, and the release film layer is an electrostatic layer. The pulling portion is connected to one end of the release film layer in the length direction or width direction and extends along this direction. The end of the pulling portion connected to the release film layer is defined as a connecting end, and the other end is defined as the free end. The free end is positioned on the side of the release film layer away from the sticking surface, and the end of the free end extends beyond the opposite end of the end of the release film layer connected to the connection end. The film applicator includes a main body portion, which defines a mounting slot for accommodating the electronic product, a pulling opening for extending the free end of the pulling portion, and a fixing portion for positioning the sticking film. When using, after the electronic product is positioned in the mounting slot and the sticking film is positioned on the fixing portion, the pulling portion is positioned between the screen of the electronic product and the release film layer with a gap existed between the screen and the release film layer. The free end of the pulling portion is pulled to separate the release film layer from the tempered film, and the surface of the release film layer attached to the tempered film has static electricity to attract the dust on the screen.

Compared with the prior art, the present disclosure has the following beneficial effects.

The film applicator includes a main body portion, which defines a mounting slot for accommodating the electronic product, a pulling opening for extending the free end of the pulling portion, and a fixing portion for positioning the sticking film. When using, after the electronic product is positioned in the mounting slot and the sticking film is positioned on the fixing portion, the pulling portion is positioned between the screen of the electronic product and the release film layer with a gap existed between the screen and the release film layer. The free end of the pulling portion is pulled to separate the release film layer from the tempered film, and the surface of the release film layer attached to the tempered film has static electricity to attract the dust on the screen. By arranging the film applicator to cooperate with the sticking film with the electrostatic layer, there is space between the screen of the electronic product and the release film layer for the pulling portion to pass through, so that steps of filming and dust removal are carried out almost simultaneously, and the sticking film is limited in a small space, which prevents the contact with too many impurities and improves the film-sticking quality.

The sticking film of the present disclosure has the effect of strong dust attraction.

The film-sticking assembly of the present disclosure has the same beneficial effects as the film applicator.

Figure 1:
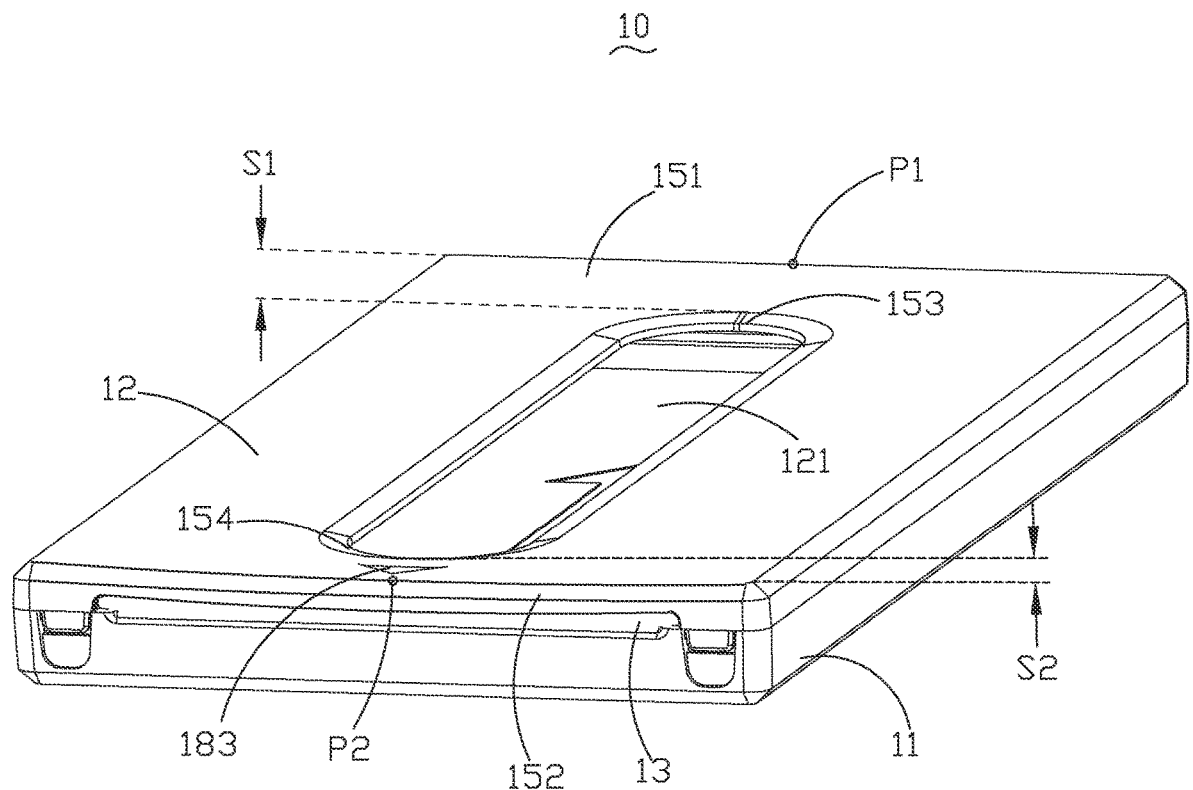
FIG. 1 is a perspective view of a film-sticking box according to a first embodiment of the present disclosure.

NUMERICAL REFERENCE IDENTIFICATION 200, sticking film; 201, tempered film; 2011, sticking surface; 202, release film layer; 2021, end portion; 2023, connecting end; 2024, free end; 240, protective layer; 241, covering portion; 242, fixing portion; 243, positioning member; 130, pulling portion; 300, electronic product; 301, screen; 10, film-sticking box; 11, base; 12, upper cover; 121, observation window; 122, sticking region; 123, fixing portion; 13, pulling opening; 14, substrate; 141, mounting slot; 142, accommodating slot; 143, groove; 144, first end wall; 145, second end wall; 146, side wall; 147, supporting edge; 151, first end; 152, second end; 153, third end; 154, fourth end; 161, positioning hole; 162, positioning pin; 171, clamping slot; 172, clamping buckle; 181, first indication mark; 182, second indication mark; 183, third indication mark; 10a, film-sticking box; 10b, film-sticking box; 10c, film-sticking box; 40, film applicator; 41, substrate; 42, mounting slot; 110, first end wall; 120, second end wall; 111, first fixing portion; 111a, first positioning pillar; 111b, fool-proof positioning pillar; 112, avoidance step; 131, second fixing portion; 131a, second positioning pillar; 132, avoidance groove; 133, transition slope; 140, supporting edge; 150, pulling slot; 160, protrusion; 170, side wall; 40a, film applicator; 40b, film applicator; 50, film applicator; 100, substrate; 180, mounting slot; 1801, material reduction slot; 112, fixing portion; 1121, spacer; 112a, fool-proof convex portion; 113, notch; 114, operation opening; 501, connecting plate; 502, positioning edge; 5021, first positioning edge; 5022, second positioning edge; 503, supporting edge; 50a, film applicator; 50b, film applicator; 50c, film applicator; 50d, film applicator; 60, film-sticking box; 800, sticking film; 900, film-sticking assembly.

DETAILED DESCRIPTION

In order to make the objectives, technical solutions, and advantages of the present disclosure clearer, the present disclosure is further described in detail below with reference to the accompanying drawings and embodiments. It should be understood that the specific embodiments described herein are provided for illustration only, and not for the purpose of limiting the present disclosure.

It should be noted that, in the present disclosure, the terms "up", "down", "left", "right", "front", "rear", "top", "bottom", "inside", "outside", "middle", "vertical", "horizontal", "longitudinal", etc. are based on the orientations or positional relationships shown in the drawings. Terms herein are primarily used to better describe the present disclosure and the embodiments, and are not intended to limit that the indicated device, element, or component must have a particular orientation, or be constructed and operated in a particular orientation.

In addition, some of the above-mentioned terms may be used to express other meanings besides orientation or positional relationship. For example, the term "on" may also be used to express a certain attachment or connection relationship in some cases. For those skilled in the art, the specific meanings of the above terms in the present disclosure can be understood according to specific situations.

Furthermore, the terms "install", "arrange", "provide", "connect", "contact" should be construed broadly. For example, it may be a fixed connection, a detachable connection, or an integral structure; it may be a mechanical connection, or an electrical connection; it may be directly connected, or indirectly connected through an intermediary, or an internal communication between two devices, elements, or components. For those skilled in the art, the specific meanings of the above terms in the present disclosure can be understood according to specific situations.

Referring to FIG. 1 to FIG. 4, a first embodiment of the present disclosure provides a film applicator, which is used to cooperate with the sticking film 200 to be pasted to the electronic product 300. The film applicator of this embodiment is a film-sticking box 10. The sticking film 200 includes a tempered film 201, a release film layer 202, a pulling portion 130 and a protective layer 240. The tempered film 201 is used to be pasted to the screen 301 of the electronic product 300. The release film layer 202 is attached to the tempered film 201, and the release film layer 202 is an electrostatic layer. Optionally, the tempered film 201 has a sticking surface 2011 attached to the release film layer 202. After the release film layer 202 is torn off via the pulling portion 130, the sticking surface 2011 is pasted to the screen 301 of the electronic product 300. The release film layer 202 and the tempered film 201 are separated when pasting, static electricity is generated on the side of the release film layer 202 attached to the tempered film 201, and the side with static electricity of the release film layer 202 is close to the screen 301 of the electronic product 300 to attract the dust on the screen.

Figure 2:
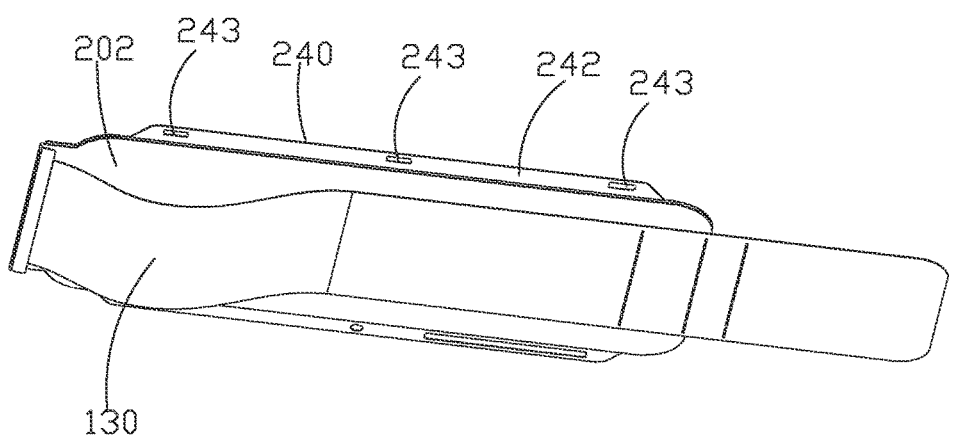
FIG. 2 is a perspective view of a sticking film according to the present disclosure.
Figure 3:
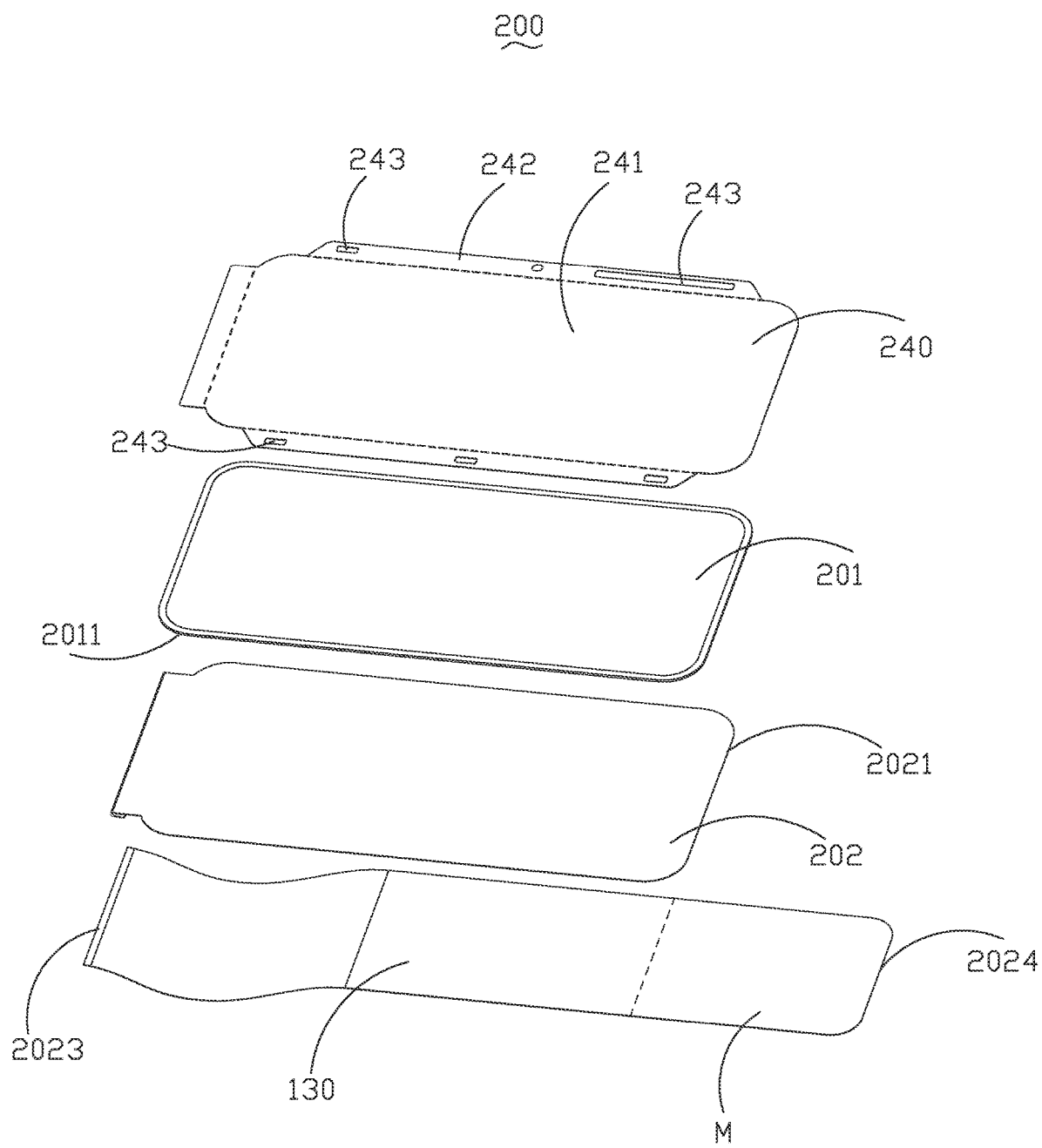
FIG. 3 is an exploded view of the sticking film according to the present disclosure.
Figure 4:
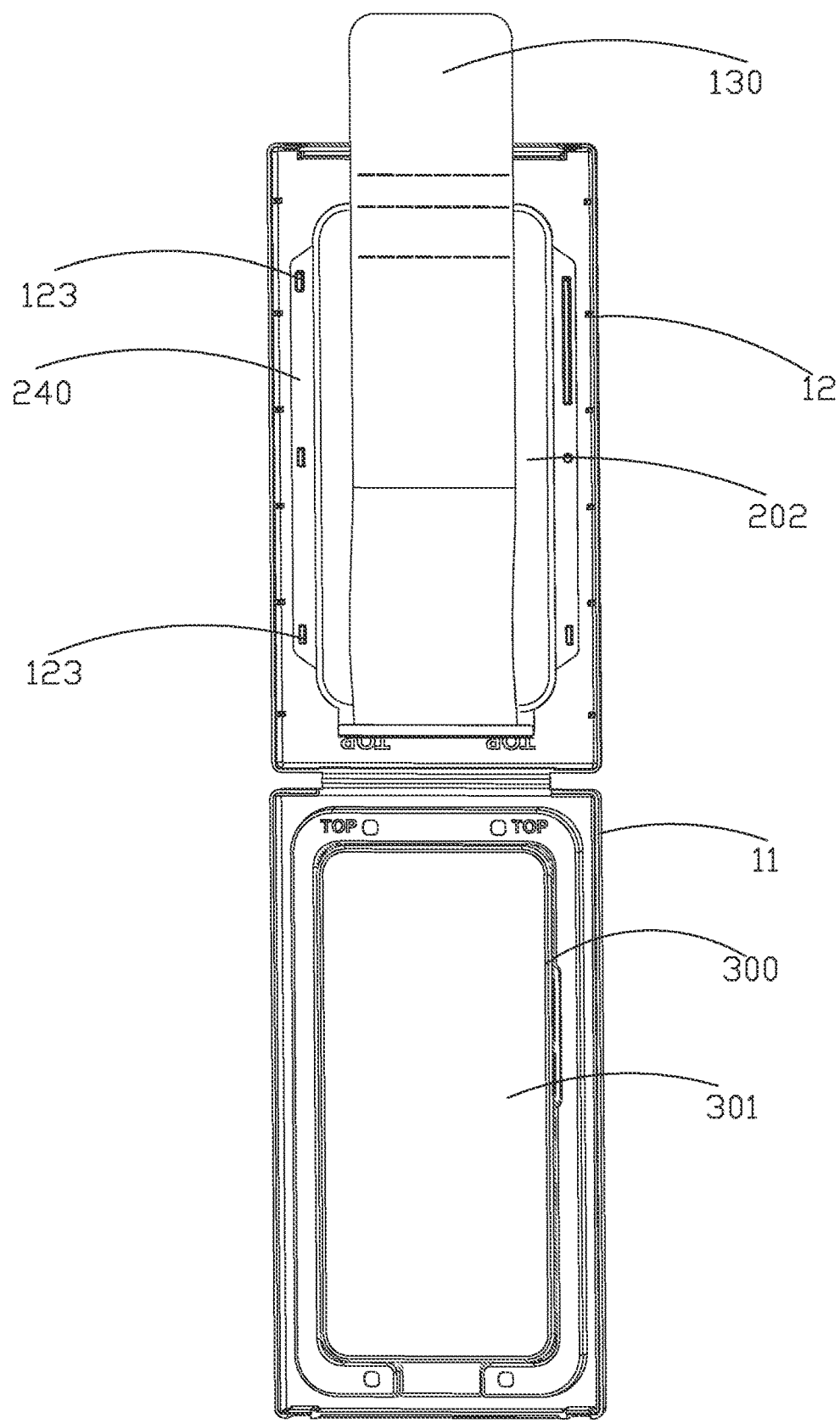
FIG. 4 is a schematic diagram of a state of the sticking film and an electronic product being positioned on the film-sticking box in the present disclosure.

Referring to FIG. 2 to FIG. 4, optionally, the release film layer 202 and the pulling portion 130 are integrally formed or separately arranged. When arranged separately, the release film layer 202 and the pulling portion 130 need to be connected by means of pasting, clamping, etc. In some embodiments, the pulling portion 130 is made of the same material as the release film layer 202, with the same thickness thereof. It can be understood that, in other embodiments, the pulling portion 130 only plays the role of pulling away the release film layer 202. In order to save the material for preparing the pulling portion 130, the thickness of the pulling portion 130 is less than instead of greater than that of the release film layer 202.

As an option, the pulling portion 130 and one end of the release film layer 202 in the length direction are pasted to be fixed as a connection therebetween, and extend along the length direction of the release film layer 202. Part or all of the pulling portion 130 is positioned on the side of the release film layer 202 away from the sticking surface 2011, that is, the side of the release film layer 202 away from the tempered film 201 can be bent by a breaking line. The pulling portion 130 extends for a certain length along the length direction of the release film layer 202. In this case, the pulling portion 130 provides the user with a more convenient force for tearing off the release film layer 202, and the tempered film 201 will not be contaminated due to the fingers touching the tempered film 201 when the release film layer 202 is torn off. In addition, the pulling portion 130 is positioned at the side of the release film layer 202 away from the sticking surface 2011, and the pulling portion 130 is pulled toward the extending direction of the pulling portion 130. At this time, the pulling portion 130 is torn from the sticking surface 2011 in a folded manner, and the operation can be performed at the top of the screen 301, that is, the release film layer 202 can be torn off in a folded manner by pulling the pulling portion 130. Thus, the side with static electricity of the release film layer 202 can be in contact with the screen 301 naturally, so that the dust can be taken away, and the use of static electricity can be maximized.

In some other embodiments, the pulling portion 130 is connected to one end portion of the release film layer 202 in the width direction. The pulling portion 130 extends for a certain length along the width direction of the release film layer 202.

Referring to FIG. 3, the end of the pulling portion 130 connected to the release film layer 202 is defined as a connecting end 2023, and the other end thereof is defined as a free end 2024. When the pulling portion 130 is connected to the connecting end 2023 of the release film layer 202 in the length direction, the extension length of the pulling portion 130 along the length direction is greater than the length of the release film layer 202, that is, the end portion of the free end 2024 is beyond the end portion of the opposite end of the end portion of the release film layer 202 connected to the connecting end 2023. After the pulling portion 130 is formed on the release film layer 202, there is a portion beyond the end portion 2021 of the release film layer 202 opposite to the connecting end 2023, as the M portion shown in FIG. 3. When the pulling portion 130 is connected to the connecting end of the release film layer 202 in the width direction, the extension length of the pulling portion 130 along the width direction is greater than the width of the release film layer 202. After the pulling portion 130 is formed on the release film layer 202, the end portion of the free end 2024 extends beyond the end portion of the opposite end of the end portion of the release film layer 202 connected to the connecting end 2023.

Referring to FIG. 2 and FIG. 3 again, the sticking film 200 further includes a protective layer 240 disposed on the side of the tempered film 201 away from the sticking surface 2011. The protective layer 240 includes a covering portion 241 covering the tempered film 201, and a fixing portion 242 extending beyond the covering portion 241. The fixing portion 242 is provided with a positioning member 243 for cooperating with the film-sticking box 10 to position the sticking film 200.

In some specific embodiments, the positioning member 243 is a through-hole or a pillar. In order to adapt to different types of film applicators, the positioning member 243 can also be arranged at other positions, such as two ends of the protective layer 240 in the width direction, as long as the positioning member 243 can adapt to the positioning structure of the film applicator.

Figure 5:
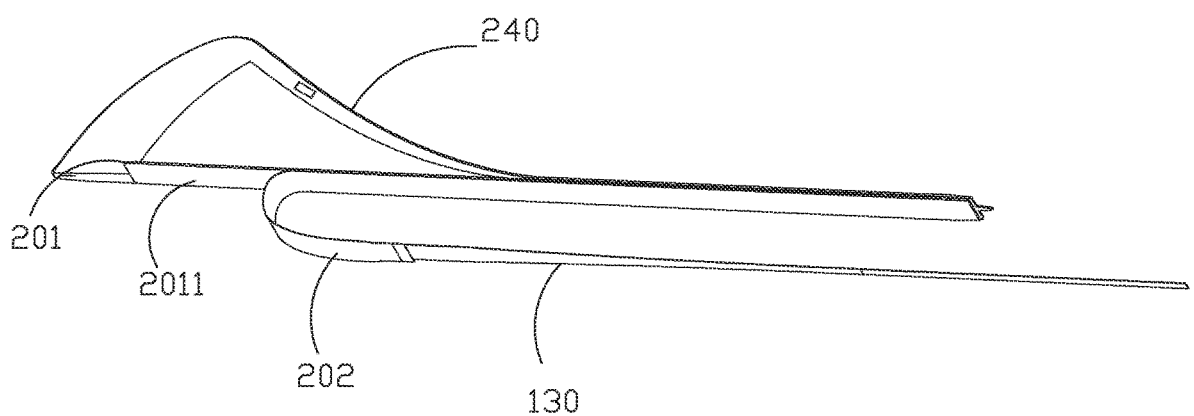
FIG. 5 is a schematic diagram of a state of the release film layer being pulled and curled between the screen of the electronic device and the tempered film when pasting in the present disclosure.

Referring to FIG. 4 and FIG. 5, when the sticking film 200 is positioned on the film-sticking box 10 and the film-sticking box 10 is closed, the pulling portion 130 is positioned between the release film layer 202 and the screen 301 of the electronic product 300, with a gap existed between the release film layer 202 and the screen 301. Based on the fact that the thickness of the pulling portion 130 is equal to that of the release film layer 202, in order to smoothly pull the pulling portion 130 to move between the screen 301 and the release film layer 202, and smoothly pull the release film layer to be torn off, when the release film layer 202 is torn off, the release film layer 202 is positioned between the tempered film 201 and the screen 301 in a curved shape. The height of the gap therebetween at least needs to be greater than or equal to the thickness of the release film layer 202. Based on the fact that the thickness of the pull-out portion 130 may be smaller than that of the release film layer 202, in order to ensure the release film layer 202 can be smoothly slid to be torn off within the gap between the release film layer 202 and the screen 301, the gap between the release film layer 202 and the screen 301 is compared with the thickness of the release film layer 202 to make the technical solution of the present disclosure clearer to those skilled in the art.

Referring to FIG. 3 to FIG. 5, by arranging the M portion extending beyond the release film layer 202, after the electronic product 300 is placed on the film-sticking box 10, there is a portion of the pulling portion 130 extending beyond the film-sticking box 10. That is, the release film layer 202 can be torn off after the electronic product 300 is placed, so that the time interval between tearing off the release film layer 202 and pasting the tempered film 201 to the screen 301 is shorter, the operation steps are more consistent, and the time in contact with the air is shortened. The process of tearing off and pasting is carried out almost at the same time, which avoids attracting too much dust and improves the film-sticking effect. During the process of tearing off the release film layer 202, the release film layer 202 generates static electricity to attract the dust on the screen 301. That is, the release film layer 202 is torn off in a folded manner by pulling the pulling portion 130, so that the side with static electricity of the release film layer 202 can be in contact with the screen 301 naturally to attract the dust on the screen 301. In some specific embodiments, the release film layer 202 is made of a material that is easy to generate static electricity by friction, so that static electricity can be generated when the release film layer 202 and the tempered film 201 are separated. Optionally, the release film layer 202 is made of synthetic-resin-based material, rubber-based material or the like. Optionally, the synthetic-resin-based material includes PET (polyethylene terephthalate), PE (polyethylene), PC (polycarbonate) or PVC (polyvinyl chloride). The rubber-based material includes SBR (styrene butadiene rubber), NBR (nitrile butadiene rubber), or some BR (butadiene rubber). As an option, in this embodiment, PET is selected as the material for preparing the release film layer 202. The PET material has a wide source, low cost, and excellent material performance. The release film layer 202 can be prepared to have different hardnesses according to requirements, so as to prepare different types of the sticking film 200.

The tempered film 201 has an impact-resisting function, and is mainly prepared by tempering a glass sample made of some silicate material. The main material and preparation process thereof are prior art, which will not be repeated here.

In other embodiments, the sticking surface 2011 of the tempered film 201 prepared based on a general process usually includes some glue, such as AB glue, OCA glue or some other polymerized organic compound. Therefore, some of the tempered films 201 easily generate static electricity when separated from the release film layer 202, which will easily cause the tempered film 201 to generate static electricity and attract the dust when the release film layer 202 is separated. When preparing the tempered film 201, some antistatic materials are added to make the tempered film 201 have antistatic properties, so that when the release film layer 202 is torn off from the tempered film 201, the tempered film 201 will not generate static electricity, which prevents the tempered film 201 from attracting dust and improves the cleanliness of the tempered film 201.

Several ways to attract dust during the pasting process of the sticking film 100 are as follows.

Way 1 is that during the process of tearing off the release film layer 202, the release film layer 202 is close to instead of in contact with the screen 301, and the static electricity thereof is used to attract dust. In this case, after the release film layer 202 is torn off, the tempered film 201 will directly face the screen 301, and the dust on the screen 301 will easily fly to the sticking surface of the tempered film 201. In order to prevent the tempered film 201 from attracting dust, it is necessary to configure the tempered film 201 as an antistatic layer.

Way 2 is that during the process of tearing off the release film layer 202, the release film layer 202 is curled between the screen 301 and the sticking surface 2011 of the tempered film 201, and the release film layer 202 falls on the screen 301 and contacts the screen 301. In this case, when torn off, the release film layer 202 first contacts the screen 301 to attract the dust, so as to prevent the dust from being adsorbed on the tempered film 201. At the same time, the release film layer 202 is in contact with the screen 301, which can well prevent the dust on the area of the screen 301 not covered by the torn release film layer 202 from flying up under the electrostatic attraction of the tempered film 201 and the release film layer 202, resulting in the tempered film 201 also attracting dust. The tempered film 201 can be an antistatic layer or a non-antistatic layer.

Referring to FIG. 1, FIG. 2, FIG. 6 and FIG. 7, the film-sticking box 10 includes a main body portion, which includes a base 11 and an upper cover 12, and the upper cover 12 includes a first end 151 and an opposite second end 152. The first end 151 is connected to the base 11, the upper cover 12 is closed on the second end 152, and a pulling opening 13 is formed by closing the upper cover 12 on the base. The upper cover 12 is recessed toward the base 11, and in the recessed area of the upper cover 12, the cross-section view of the upper cover cut by a direction perpendicular to the length direction of the upper cover 12 is in the shape of a concave arc. The curvature of the concave arc of the upper cover 12 gradually increases from the first end 151 to the second end 152. Optionally, the middle area of the upper cover 12 in the direction from the first end 151 to the second end 152 is recessed.

The upper cover 12 can be opened or closed, and manners of connecting the upper cover 12 and the base 11 are various. For example, the upper cover 12 is rotatably connected to the base 11. One end between the first end 151 of the upper cover 12 and the base 11 is provided with a connecting member, which can be rotated, and by rotating the connecting member, the upper cover 12 can be rotated around the base 11 to be opened or closed. The connecting member may be a rotating shaft, or a flexible plastic, or the like. The upper cover 12 and the base 11 can also be hinged through hinges. The upper cover 12 and the base 11 can further be slidably connected. Guide rails or guide grooves are arranged on both sides of the base 11 in the length direction, and corresponding guide grooves or guide rails are arranged on both sides of the length direction of the upper cover 12, so that the upper cover 12 slides on the base 11 to close and open the upper cover 12. After the sticking film 200 is positioned on the film-sticking box 10, the release film layer 202 is provided with a pulling portion 130, which can pass through the pulling opening 13. The closer to the first end 151, the smaller the concave degree of the upper cover 12; the closer to the second end 152, the greater the concave degree of the upper cover 12. The recessed area of the upper cover 12 may extend continuously from the first end 151 to the second end 152, or may extend continuously from any position between the first end 151 and the second end 152 to the second end 152. The recessed area may also extend between any two positions from the first end 151 to the second end 152.

The upper cover 12 and/or the end face opposite to the second end 152 of the base 11 are cut along the height direction to form a notch to define the pulling opening 13.

When pasting, the sticking film 200 is placed in the film-sticking box 10, and the pulling portion 130 passes through the pulling opening 13. The height of the gap between the screen 301 and the release film layer 202 at the end with the less concave degree is equal to the thickness of the release film layer 202, and the end with less concave degree of the upper cover 12 is in contact with the sticking film 200, which also makes the sticking film 200 in contact with the screen 301. That is, the inner surface of the upper cover 12, the sticking film 200 and the screen 301 are in contact with each other in sequence. When the pulling portion 130 is pulled, the release film layer 202 is separated from the tempered film 201, and the tempered film 201 is in direct contact with the screen 301. The concave upper cover 12 gives a pressure to the sticking film 200 so that the tempered film 201 can be pasted to the screen 301. The upper cover 12 has elasticity, and the pressure applied by the upper cover 12 to the sticking film 200 is a variable elastic force, which will not be too large to damage the screen 301 of the electronic product 300, but can also provide a suitable pressure to make the tempered film 201 attach to the screen 301 so that the generation of air bubbles is reduced or even no air bubbles are generated. At the same time, the dislocation of the tempered film 201 and the screen 301 of the electronic product 300 due to incomplete attachment is prevented, which improves the film-sticking effect of the electronic product 300. The concave degree of the upper cover 12 close to the first end 151 is small, and the pressure applied by the upper cover 12 to the sticking film 200 is small, or even no pressure is applied, so that there is still a certain distance between the sticking film 200 and the screen 301, and the pulling portion 130 can be pulled easily. The concave degree of the upper cover 12 close to the second end 152 is large, and the pressure applied by the upper cover 12 to the sticking film 200 is large, and a larger frictional force can be generated between the release film layer 202 and the screen 301 so that the static electricity of the release film layer 202 can attract and take away the dust on the screen 301 of the electronic product 300.

The recessed area of the upper cover 12 extends to the second end 152 in the direction from the first end 151 to the second end 152, or extends from any position between the first end 151 and the second end 152 to the second end 152, and the upper side of the pulling opening 13 is in the shape of a downward concave arc. The pressure applied by the upper cover 12 to the sticking film 200 is the largest at the second end 152. After the release film layer 202 is torn off from the first end 151 to the second end 152, the tempered film at the lower end, that is, the tempered film 201 at the second end 152 is in contact with the screen 301 first, and then is gradually pasted to the screen 301 from this end to the direction of the first end 151, so that the direction of the film-sticking process is a fixed direction, and air bubbles can be discharged by the pressure to improve the quality of the film sticking.

The concave arc of the upper cover 12 can be well formed by the preparation of the mold with the corresponding concave arc, or by the preparation of the film box 10 made of thermoplastic material, such as PP material. If the thickness of the upper cover 12 is set to a relatively thin size, and the relative middle portion is not provided with a structure for connecting with the base 11, there will be a cooling and shrinkage process in the cooling stage after the thermal injection molding is completed, so that a corresponding concave arc is naturally formed on the upper cover 12 after the cooling process.

Referring to FIG. 1, an observation window 121 is defined on the upper cover 12, which extends along the length direction of the upper cover 12. The observation window 121 includes a third end 153 close to the first end 151 of the upper cover 12 and a fourth end 154 close to the second end 152 of the upper cover 12.

The observation window 121 is arranged in a "1" shape in the length direction of the upper cover 12, or can also be arranged in other shapes, such as "T" shape, "Z" shape, "I" shape, etc. During the demolding process of the film-sticking box 10, the upper cover 12 will be recessed toward the base 11 around the observation window 121 due to the structure of the film-sticking box 10 and the stress around the observation window 121. The shape of the observation window 121 is different, the stress around the observation window 121 is accordingly different, and the upper cover 12 will have different concave degrees around the observation window 121 toward the base 11. In one embodiment, the observation window 121 is arranged in a "1" shape along the length direction of the upper cover 12. During the film-sticking process, air bubbles may be generated, and the sticking film 200 can be pressed through the observation window 121 to discharge the air bubbles. The arrangement of the observation window 121 also facilitates opening and closing the upper cover 12. The upper cover 12 can be easily opened by buckling the upper cover 12 at the observation window 121, and can be easily closed by buckling the upper cover 12 at the observation window 121 and pressing the upper cover 12. In addition, the arrangement of the observation window 121 also facilitates the separation of the sticking film 200 and the upper cover 12. The sticking film 200 is fixed on the inner side of the upper cover 12. When the sticking film 200 and the upper cover 12 needs to be separated, the upper cover 12 and the sticking film 200 can be easily separated by directly pushing the sticking film 200 through the observation window 121 on the outer side of the upper cover 12.

The distance between the third end 153 and the first end 151 is defined as S1, the distance between the fourth end 154 and the second end 152 is defined as S2, and S1>S2. In one embodiment, the observation window 121 is arranged in a "1" shape along the length direction of the upper cover 12, and the distance between the third end 153 and the first end 151 is greater than the distance between the fourth end 154 and the second end 152. Since S2<S1, the stress of the observation window 121 is larger at the position close to the fourth end 154, while the stress is smaller at the position close to the third end 153; the concave degree of the upper cover 12 is larger at the position close to the fourth end 154, while the concave degree is smaller at the position close to the third end 153. In the concave area of the upper cover 12, the curvature of the concave arc of the upper cover 12 gradually increases from the third end 153 to the fourth end 154 in the direction from the first end 151 to the second end 152.

Figure 8:
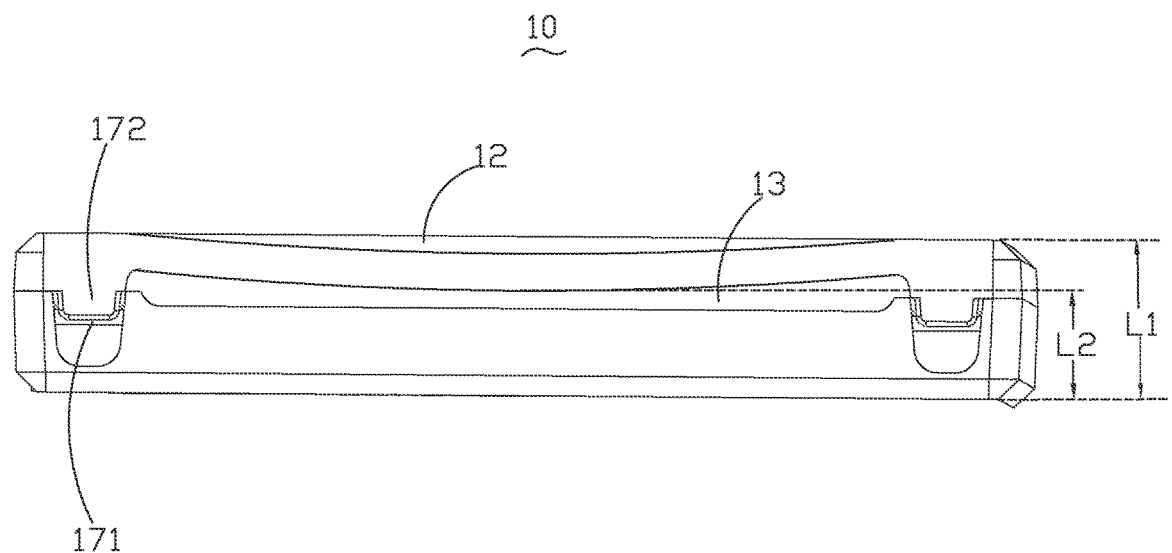
FIG. 8 is a front view of the film-sticking box according to the first embodiment of the present disclosure.

Referring to FIG. 1 and FIG. 8, at the edge of the first end 151, a first midpoint P1 is defined on the outer surface of the upper cover 12, which is arranged at the midpoint of the edge of the first end 151 of the outer surface of the upper cover 12, and the distance between the first midpoint P1 and the base 11 is defined as L1; at the edge of the second end 152, a second midpoint P2 is defined on the outer surface of the upper cover 12, which is arranged at the midpoint of the edge of the second end 152 of the outer surface of the upper cover 12, and the distance between the second midpoint P2 and the base 11 is defined as L2, and L1>L2. The upper cover 12 has a downward slope from the first end 151 to the second end 152, and the concave degree of the upper cover 12 gradually increases from the first end 151 to the second end 152 in the direction from the first end 151 to the second end 152.

The first midpoint P1 is arranged at the midpoint of the edge of the first end 151 of the outer surface of the upper cover 12, and the distance between the first midpoint P1 and the base 11 is defined as L1; the second midpoint P2 is arranged at the midpoint of the edge of the second end 152 of the outer surface of the upper cover 12, and the distance between the second midpoint P2 and the base 11 is defined as L2. L1 and L2 have the following relationship: L1>L2, and 1 mm<L1-L2<3 mm. When the base 11 of the film-sticking box 10 is laid flat, the first midpoint P1 is 1-3 mm higher than the second midpoint P2. The curvature of concave arc of the upper cover 12 gradually increases in the direction from the first end 151 to the second end 152. The curvature of the concave arc of the upper cover 12 is the smallest at the first end 151 and is the largest at the second end 152.

Figure 6:
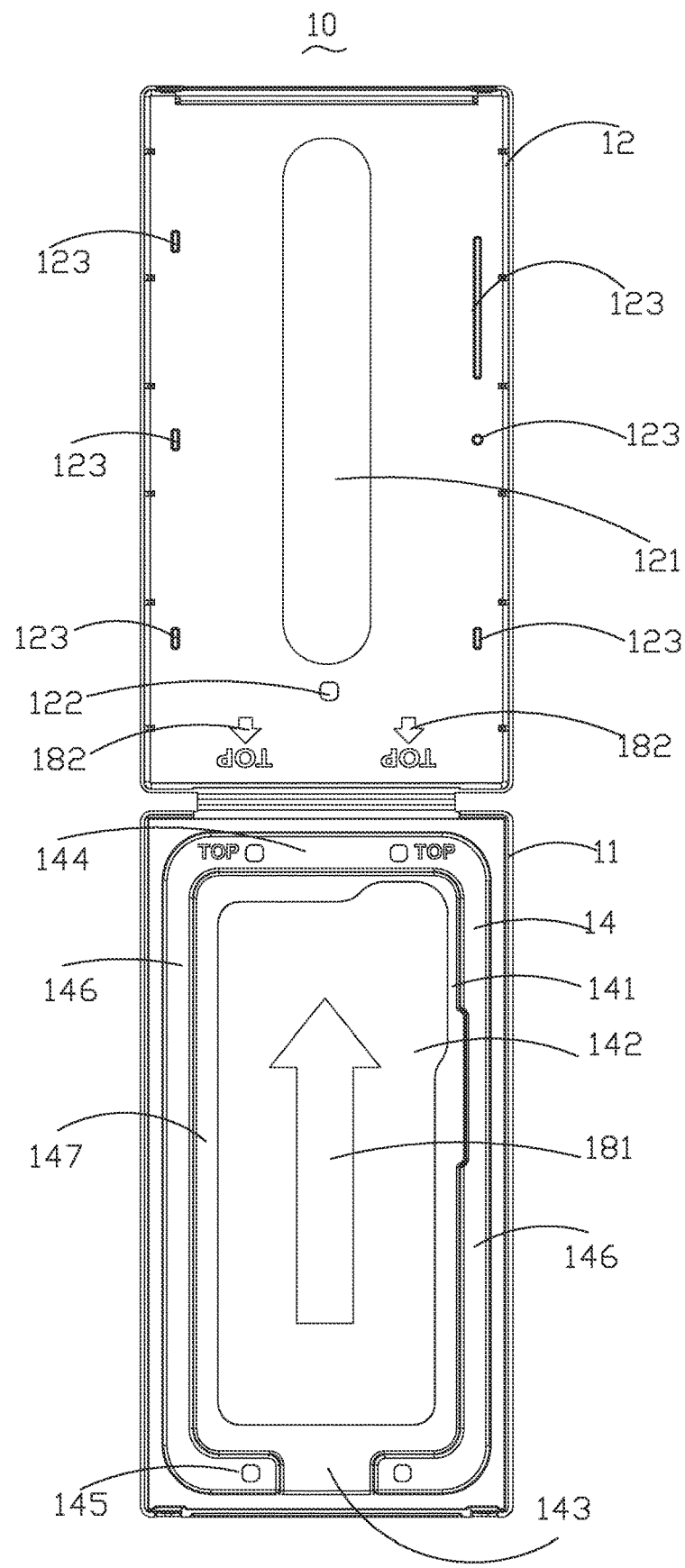
FIG. 6 is a perspective view of the film-sticking box according to the first embodiment of the present disclosure in an open state.
Figure 7:
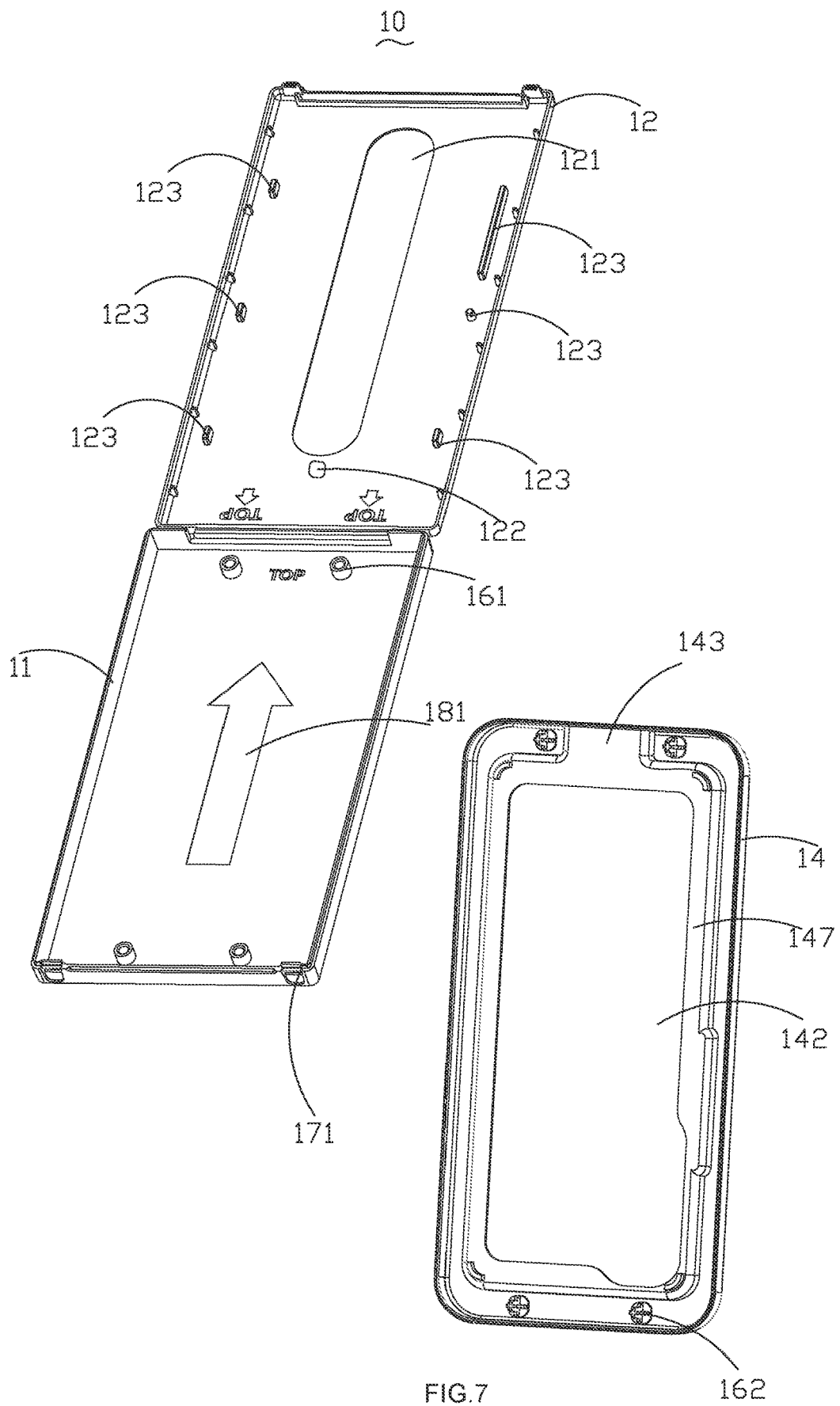
FIG. 7 is an exploded view of the film-sticking box according to the first embodiment of the present disclosure.

Referring to FIG. 6 and FIG. 7, the inner side of the upper cover 12 is provided with a sticking region 122, which is arranged at any position that can be covered by the sticking film 200, and the area of the sticking region 122 is not limited, as long as the sticking region 122 can adhere the sticking film 200 to the sticking region 122. In order to reduce the cost, the area of the sticking region 122 may be set to 2-5 cm². The sticking region 122 can be coated with an adhesive, or can be adhered with a double-sided adhesive tape, or other methods for adhering the sticking film 200 to the inner side of the upper cover 12, which are not limited herein. In one embodiment, the sticking region 122 is arranged next to the observation window 121 at the end of the concave arc with a smaller curvature. The sticking region 122 is pasted with an unused double-sided adhesive tape, and the protective paper layer of the double-sided adhesive tape can prevent the sticking film 200 from adhering to the upper cover 12 in advance, and can prevent the adhesive layer of the sticking region 122 from being exposed and losing its adhesiveness, which may reduce the adhesive effect. When sticking the film, the protective paper layer of the double-sided adhesive tape is torn off, the sticking film 200 is fixed on the inner side of the upper cover 12, and the release film layer 202 is adhered by the double-sided adhesive tape. When the pulling portion 130 is pulled, the tempered film 201 is pasted to the screen 301 of the electronic product 300, the pulling portion 130 is separated from the tempered film 201, and the release film layer 202 remains on the upper cover 12. There is no need to manually separate the release film layer 202 and the tempered film 201, which reduces the operation steps of film sticking, and is convenient and quick.

Referring to FIG. 3, FIG. 6 and FIG. 7, the inner side of the upper cover 12 is provided with a plurality of fixing portions 123, which are arranged inside the upper cover 12, and are arranged on two opposite sides of the upper cover 12 in the length direction of the upper cover 12. The fixing portion 123 cooperates with the positioning member 243 of the sticking film 200 to fix the sticking film 200 on the inner side of the upper cover 12, which ensures the consistency of the positions of the sticking film 200 and the screen 301 of the electronic product 300, so that when the film is pasted, the sticking film 200 and the screen 301 of the electronic product 300 will not be displaced. The fixing portion 123 may have various shapes, such as a convex cylindrical shape, a convex elongated shape, a square shape, a diamond shape, etc. In order to prevent the user from installing the sticking film 200 in a reverse order, the shapes of the fixing portions 123 arranged on one side and on the other side of the upper cover 12 may be different, even the shapes of the fixing portions 123 on the same side of the upper cover 12 may be different. In one embodiment, the three short-strip-shaped fixing portions 123 are sequentially arranged on one side of the upper cover 12, and the shapes of the fixing portions 123 sequentially arranged at the other side of the upper cover 12 are respectively the shape of elongated bar, short bar and cylinder. The obvious cylindrical or elongated fixing portion 123 is selected to facilitate the user to clearly distinguish the front and rear sequence of the sticking film 200, and to position and install the sticking film 200 quickly and accurately.

It should also be noted that since the fixing portions 123 are arranged at two opposite side edges of the upper cover 12, the strength of the edges on both sides of the upper cover 12 can be well strengthened, so that when the upper cover 12 is prepared, the middle position of the upper cover 12 can be well recessed.

Referring to FIG. 6 and FIG. 7 again, the film-sticking box 10 further includes a substrate 14, which is mounted on the base 11 and is provided with a mounting slot 141. The shape and size of the mounting slot 141 are configured according to specific electronic product models, since different electronic product models have different positions of the volume key and the power key. In the mounting slot 141, according to the specific model of the electronic product 300, an empty space can be left at the positions of the volume key and the power key. The electronic product 300 is placed in the mounting slot 141 to be fixed in the film-sticking box 10, and will not be displaced or shaken, and the dislocation of the sticking film 200 and the screen 301 of the electronic product 300 is prevented, thereby improving the film-sticking effect of the electronic product 300. The substrate 14 is further provided with a positioning pin 162, and the base 11 is provided with a corresponding positioning hole 161. The bottom of the substrate 14 is provided with a plurality of positioning pins 162, and the number and position of the positioning pins 162 are generally not limited. In order to ensure the stability of the substrate 14 mounted on the base 11, control the cost and simplify the production process, four positioning pins 162 may be arranged in four directions of the substrate 14 and distributed in a rectangular shape on the substrate 14. Correspondingly, four positioning holes 161 are protruded on the base 11, and the four positioning holes 161 are arranged in four directions of the base 11 and distributed in a rectangular shape on the base 11. The positioning holes 161 correspond to the positioning pins 162 respectively, with the same number, corresponding positions, and matching sizes. The positioning pins 162 can be inserted into the positioning holes 161 without displacement or shaking. The substrate 14 is detachably mounted on the base 11. When pasting, the substrate 14 is mounted on the base 11, the electronic product 300 is placed on the substrate 14, and the electronic product 300 is fixed in the film-sticking box 10, so that the electronic product 300 will not be displaced or shaken, which prevents the dislocation of the sticking film 200 and the screen 301 of the electronic product 300, and improves the film-sticking effect of the electronic product 300.

The substrate 14 includes a first end wall 144 and an opposite second end wall 145, and two side walls 146 arranged between the first end wall 144 and the second end wall 145. The first end wall 144, the second end wall 145 and the two side walls 146 define the mounting slot 141, and the inner positions of the first end wall 144, the second end wall 145 and the side walls 146 are provided with supporting edges 147 to support the electronic product 300.

Referring to FIG. 6 and FIG. 7, the substrate 14 further defines an accommodating slot 142, which is arranged below and communicates with the mounting slot 141. Generally, a camera is protruded from the back of the electronic product 300, and the camera and the back of the electronic product 300 are not on the same plane, which may cause the electronic product 300 to be unstable. By arranging the accommodating slot 142 below the mounting slot 141, the camera is accommodated in the accommodating slot 142, and the electronic product 300 can be smoothly mounted in the mounting slot 141, which further ensures the stability of the electronic product 300 and the film-sticking effect of the electronic product 300. The position of the accommodating slot 142 can be configured at different positions according to different models of electronic products and different positions of cameras.

Referring to FIG. 6 and FIG. 7, the substrate 14 further defines a groove 143, which is communicated with the mounting slot 141. The groove 143 is disposed on the first end wall 144 or the second end wall 145, and the groove bottom of the groove 143 and the slot bottom of the mounting slot 141 are on the same plane. The shape of the groove 143 is not limited, and the size of the groove 143 can accommodate a finger of an adult. The arrangement of the groove 143 is convenient for placing the electronic product 300 in and taking the electronic product 300 out of the mounting slot 141. The electronic product 300 can be placed in or taken out by holding the electronic product 300 with fingers at the groove 143, which is convenient and quick.

Referring to FIG. 7 and FIG. 8, the upper cover 12 and the base 11 are clamped at the second end 152. Both sides of the base 11 in the width direction are provided with clamping slots 171, and the upper cover 12 is provided with clamping buckles 172 corresponding to the clamping slots 171 on both sides of the second end 152 in the width direction. The upper cover 12 and the base 11 are clamped at the second end 152 through the cooperation of the clamping slot 171 and the clamping buckle 172. After the upper cover 12 is closed, the upper cover 12 and the base 11 are relatively fixed, and the upper cover 12 will not shake, which ensures the stability of each component, and prevents the dislocation of the sticking film 200 and the screen 301 of the electronic product 300, thereby improving the film-sticking effect of the electronic product 300.

Based on the fact that the clamping slots 171 are arranged on both sides of the base 11 and the clamping buckles 172 are arranged on both sides of the upper cover 12, the pulling opening 13 is formed at the middle portion between the upper cover 12 and the second end 152 of the base 11. Since the clamping buckles 172 are arranged at the edge positions of both sides of the upper cover 12, the formation of the pulling opening 13 is not affected. In addition, the strength of the edges on both sides of the second end 152 of the upper cover 12 can be well strengthened, so that when the upper cover 12 is prepared, the middle position of the second end 152 of the upper cover 12 is recessed. Due to the large deformation of the second end 152, the user can press the second end 152 during the process of sticking to make the tempered film 201 to be pasted to the screen 301 of the electronic product 300.

Referring to FIG. 1 to FIG. 6, the film-sticking box 10 is provided with indication marks, which include a first indication mark 181, a second indication mark 182 and a third indication mark 183. The first indication mark 181 is disposed on the inner side of the base 11, points from the end close to the pulling opening 13 to the end away from the pulling opening 13, and is used to indicate the placement direction of the electronic product 300. The second indication mark 182 is disposed on the inner side of the upper cover 12, is close to the first end 151, points from the second end 152 to the first end 151, and is used to indicate the installation direction of the sticking film 200. The use of the second indication mark 182 in cooperation with the fixing portion 123 can increase the user's recognition of the direction of the film-sticking box 10, so that the user can quickly and accurately fix the sticking film 200 on the upper cover 12. The third indication mark 183 is disposed on the outer side of the upper cover 12 away from the base 11, is close to the second end 152, points from the first end 151 to the second end 152, and is used to indicate the opening and closed position of the film-sticking box 10. The first indication mark 181, the second indication mark 182 and the third indication mark 183 are concave indication arrows, and the indication marks will not become blurred due to wear and tear even if used for many times. In other embodiments, the first indication mark 181, the second indication mark 182 and the third indication mark 183 may also be protruded indication arrows, and may also be indication arrows drawn in color or text descriptions, etc.

The material of the film-sticking box 10 is not limited, and can be made of polymer or metal. In one embodiment, the film-sticking box 10 is made of plastic. Plastics are polymer compounds that are polymerized from monomers through polyaddition or polycondensation. Plastic is light in weight, easy to transport and use; plastic has good transparency and wear resistance, is not easy to wear, and has a long lifetime; plastic has good formability, good colorability, is easy to process and has low processing cost; plastic has a certain elasticity, can perform elastic deformation, which is more convenient for the upper cover 12 to be recessed.

Figure 9:
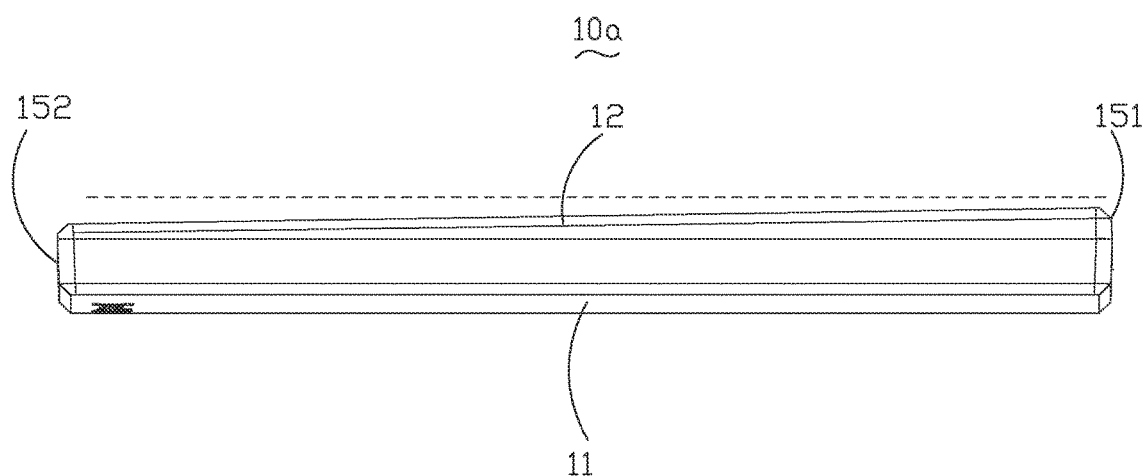
FIG. 9 is a side view of another film-sticking box 10a according to a second embodiment of the present disclosure.
Figure 10:
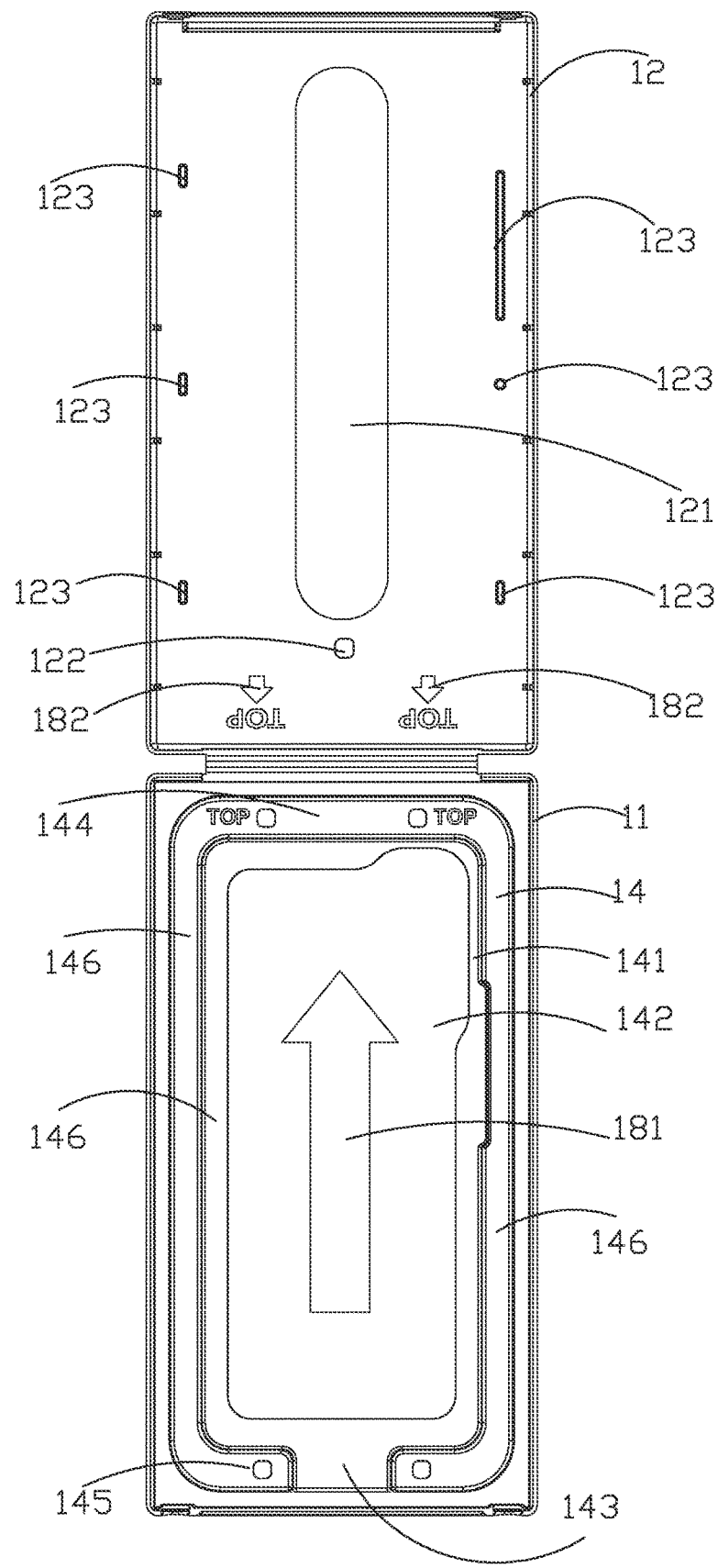
FIG. 10 is a schematic diagram of another film-sticking box 10a according to the second embodiment of the present disclosure in an open state.

Referring to FIG. 9 and FIG. 10, a second embodiment of the present disclosure provides another film-sticking box 10a, which is different from the film-sticking box 10 of the first embodiment mainly in that the upper cover 12 is not recessed, instead, the inner surface of the upper cover 12 is configured to be inclined relative to the horizontal plane (the dotted line is horizontal relative to the horizontal plane), and the height of the inner surface of the upper cover 12 relative to the horizontal plane gradually decreases from the first end 151 to the second end 152 in the length direction of the upper cover 12. The supporting edge 147 is horizontal relative to the horizontal plane. After the electronic product 300 is positioned in the mounting slot 141 and the sticking film 200 is positioned, the two ends of the tempered film 201 in the length direction are inclined relative to the screen 301. The height of the tempered film 201 relative to the screen 301 gradually decreases from the first end 151 to the second end 152.

It can be understood that the height of the inner surface of the upper cover 12 relative to the horizontal plane can also gradually decrease from the first end 151 to the second end 152 in the width direction of the upper cover 12, and the supporting edge 147 is horizontal relative to the horizontal plane. After the electronic product 300 is positioned in the mounting slot 141 and the sticking film 200 is positioned, the two ends of the tempered film 201 in the width direction are inclined relative to the screen 301, and the height of the tempered film 201 relative to the screen 301 gradually decreases from the first end 151 to the second end 152.

Figure 11:
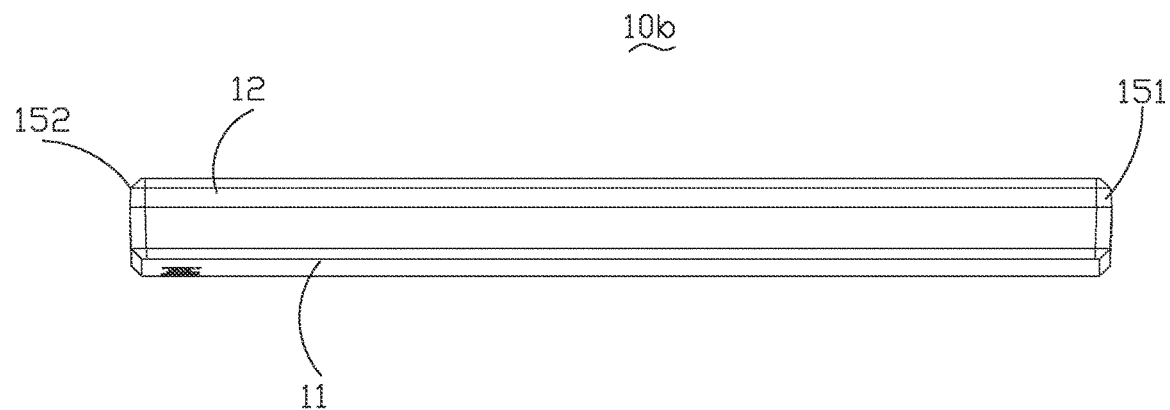
FIG. 11 is a side view of another film-sticking box 10b according to a third embodiment of the present disclosure.
Figure 12:
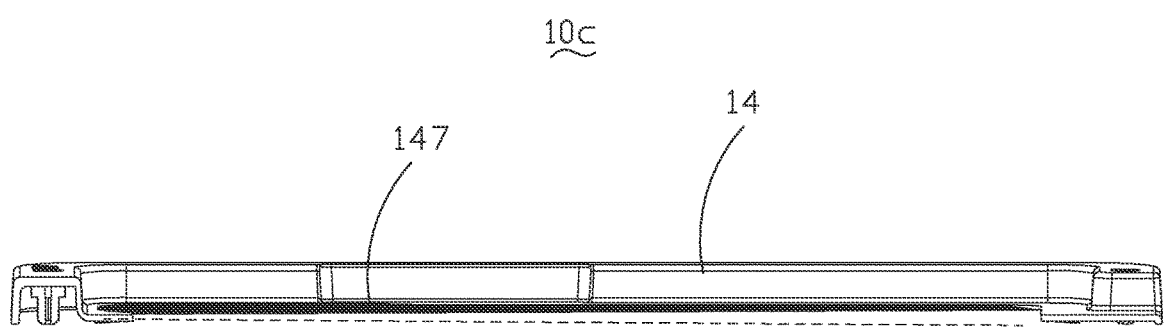
FIG. 12 is a cross-sectional view of a substrate of another film-sticking box 10b according to the third embodiment of the present disclosure.

Referring to FIG. 11 and FIG. 12, a third embodiment of the present disclosure provides another film-sticking box 10b. The inner surface of the upper cover 12 for fixing the sticking film 200 is at the same height relative to the horizontal plane, and the supporting edge 147 is inclined relative to the horizontal plane (the dotted line is horizontal relative to the horizontal plane). The height relative to the horizontal plane gradually increases from the first end 151 to the second end 152, and the tempered film 201 is horizontal relative to the horizontal plane. After the electronic product 300 is placed, the height of the tempered film 201 close to the second end 152 relative to the screen 301 is lower than the height of the tempered film 201 close to the first end 151 relative to the screen 301.

In some optional embodiments, the pulling portion 130 at the lower-concave end of the upper cover 12, or at the lower end of the tempered film 201 relative to the horizontal plane, is not in contact with the screen 301. After the sticking film 200 is positioned, there is a certain spatial distance between the sticking film 200 and the screen 301, that is, the distance between the release film layer 202 and the screen 301 is greater than the thickness of the release film layer 202. When the release film layer 202 is torn off, the release film layer 202 is positioned between the tempered film 201 and the screen 301 in a curved shape.

Figure 13:
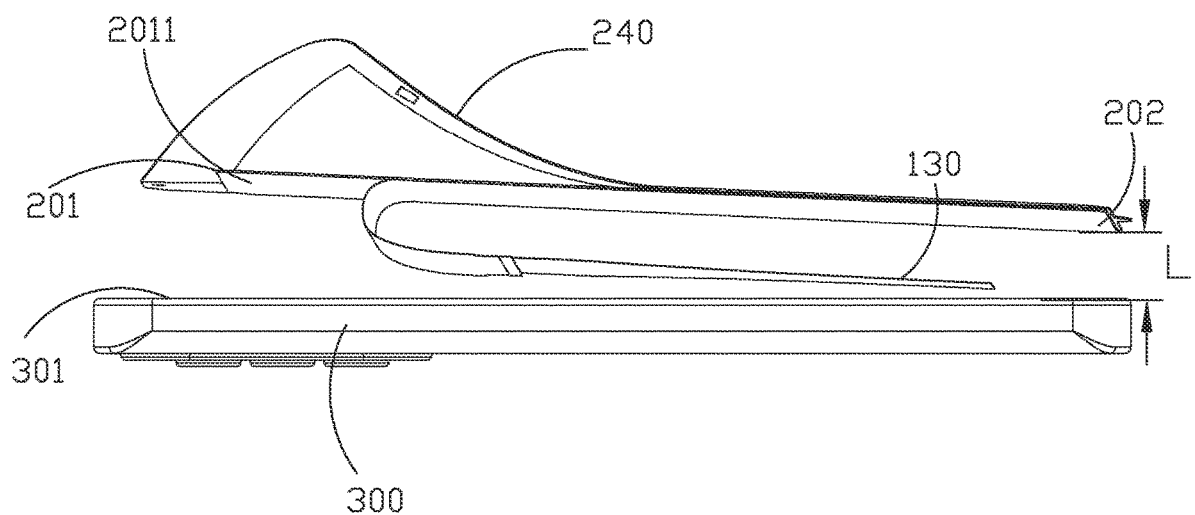
FIG. 13 is a schematic diagram of a state of the film-sticking box opposite to the sticking film in the present disclosure.

Referring to FIG. 13, in order to make the tempered film 201 smoothly aligned and pasted to the screen 301 of the electronic product 300 after the release film layer 202 is torn off, and to make the release film layer 202 can be torn off smoothly in a curled state, in some specific embodiments, the distance L between the screen 301 and the release film layer 202 is equal to 3-300 times the thickness of the release film layer 202. Optionally, the range of the distance L may also be 5 times, 15 times, 30 times, 50 times, 80 times, 130 times, 200 times, or 250 times the thickness of the release film layer 202.

As an option, in order to make it easier to tear off the release film layer 202, the distance L is equal to 100-300 times the thickness of the release film layer 202. When the release film layer 202 is torn off, the side of the release film layer 202 in contact with the sticking surface 2011 is in contact with the screen 301 naturally. That is, the upper cover 12 of the film-sticking box 10 will not produce a pressing force on the sticking film 200, and there is almost no friction between the torn off release film layer 202 and the screen 301. Optionally, the range of the distance L may also be 115 times, 125 times, 130 times, 150 times, 180 times, 200 times, 220 times, or 250 times the thickness of the release film layer 202. Since some dusts are relatively fine, or the attraction is relatively strong, the side of the release film layer 202 in contact with the sticking surface 2011 is configured to be in natural contact with the screen 301, so that the release film layer 202 and the screen 301 can directly attract these fine dusts and the cleaning ability can be improved.

In some other embodiments, the distance L is equal to 3-100 times the thickness of the release film layer 202. When the release film layer 202 is torn off, the side of the release film layer 202 in contact with the sticking surface 2011 is in pressing contact with the screen 301. That is, after the upper cover 12 of the film-sticking box 10 is closed, there is a pressing force on the curled release film layer 202. Thus, when the release film layer 202 is torn off, the release film layer 202 is in contact with the screen 301 and has frictional force, so that the release film layer 202 further generates static electricity, the effect of generating static electricity by the release film layer 202 is enhanced, and the dust on the screen 301 can be attracted better. Optionally, the range of the distance L may also be 10 times, 30 times, 50 times, 70 times, 80 times or 90 times the thickness of the release film layer 202.

Referring to FIG. 1 to FIG. 12, in the film-sticking box 10 of the first embodiment, the concave upper cover 12 is provided; in the film-sticking box 10a of the second embodiment, the upper cover 12 is configured with an inclined structure; in the film-sticking box 10b of the third embodiment, the supporting edge 147 on the base 14 is configured at an inclined angle, so that the distance between the tempered film 201 on the side close to the pulling opening 13 and the screen 301 is relatively low, and the distance between the tempered film 201 on the side away from the pulling opening 13 and the screen 301 is relatively high. In the process of sticking, the tempered film 201 on the lower side is in contact with the screen 301 first, and then the tempered film 201 is attached from this end to the opposite end. Thus, the direction of the film is well controlled, so that the direction of the film pasting is in a fixed direction, which is conducive to taking away the air bubbles and improving the quality of the film pasting. That is, the direction of tearing off the release film layer 202 is carried out from the first end 151 to the second end 152, the film pasting is applied from the second end 152 to the first end 151, which means the directions of tearing and sticking are opposite.

It should be noted that, in some other embodiments, the tempered film 201 on the side close to the pulling opening 13 is configured at a higher height relative to the screen 301, and the tempered film 201 on the side away from the pulling opening 13 is configured at a lower height relative to the screen 301. This configuration is also possible, as long as a height difference can be formed to ensure that the air bubbles are discharged in one direction. When pasting, the direction of tearing off the release film layer 202 is from the first end 151 to the second end 152, and the film sticking is also carried out in the direction from the first end 151 to the second end 152, which means the directions of tearing and sticking are the same. In this case, when the release film layer 202 of the first end 151 is torn off, the tempered film 201 at this end can be pressed to contact the screen 301 to realize the film sticking, that is, the effect of tearing and sticking can be realized almost simultaneously, which can prevent dust from entering the screen 301 better.

Figure 14:
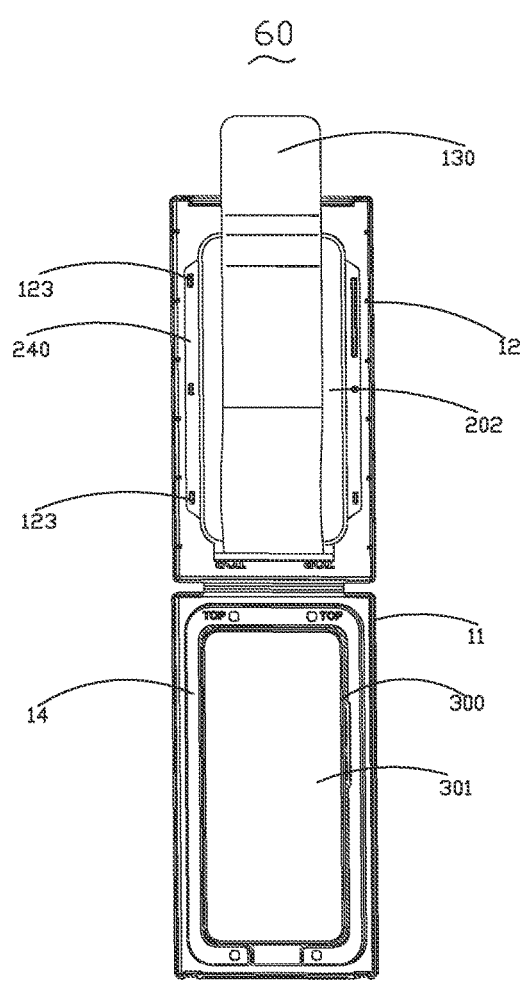
FIG. 14 is a schematic diagram of a film-sticking box according to a fourth embodiment of the present disclosure in an open state.

Referring to FIG. 14, in a fourth embodiment of the present disclosure, another film-sticking box 60 is provided. The upper cover 12 is arranged horizontally relative to the horizontal plane, and the substrate 14 is also arranged horizontally relative to the horizontal plane. After the electronic product 300 and the sticking film 200 is positioned, the height of the tempered film 201 relative to the surface of the screen 301 is the same, and there is no inclination angle, as long as the height of the tempered film 201 relative to the screen 301 is controlled within a suitable range to ensure that the tempered film 201 can be aligned and pasted to the screen 301 after the release film layer 202 is torn off. The height of the tempered film 201 relative to the surface of the screen 301 ranges from 3-300 times the thickness of the release film layer 202.

Referring to FIG. 1 to FIG. 14, for the sticking film 200, an optional film-pasting process includes steps of:

P1, placing the electronic product 300 to be attached with the tempered film 201 in the mounting slot 141;

P2, positioning the sticking film 200 on the film-sticking box 10, positioning the pulling portion 130 between the screen 301 and the release film layer 202, tearing off the release film layer 202 from the tempered film 201 by pulling the M portion of the pulling portion 130 that extends beyond the film-sticking box 10, placing the side of the torn release film layer 202 that is attached to the sticking surface 2011 close to or in contact with the screen 301 to attract the dust on the screen 301; and P3, pressing one end of the surface of the protective layer 240 to make one end of the screen 301 first contact the tempered film 201, then gradually contacting the tempered film 201 with the remaining area of the screen 301 from the first-contact end, so that the direction of the film pasting is fixed, which is beneficial to remove air bubbles.

Figure 15:
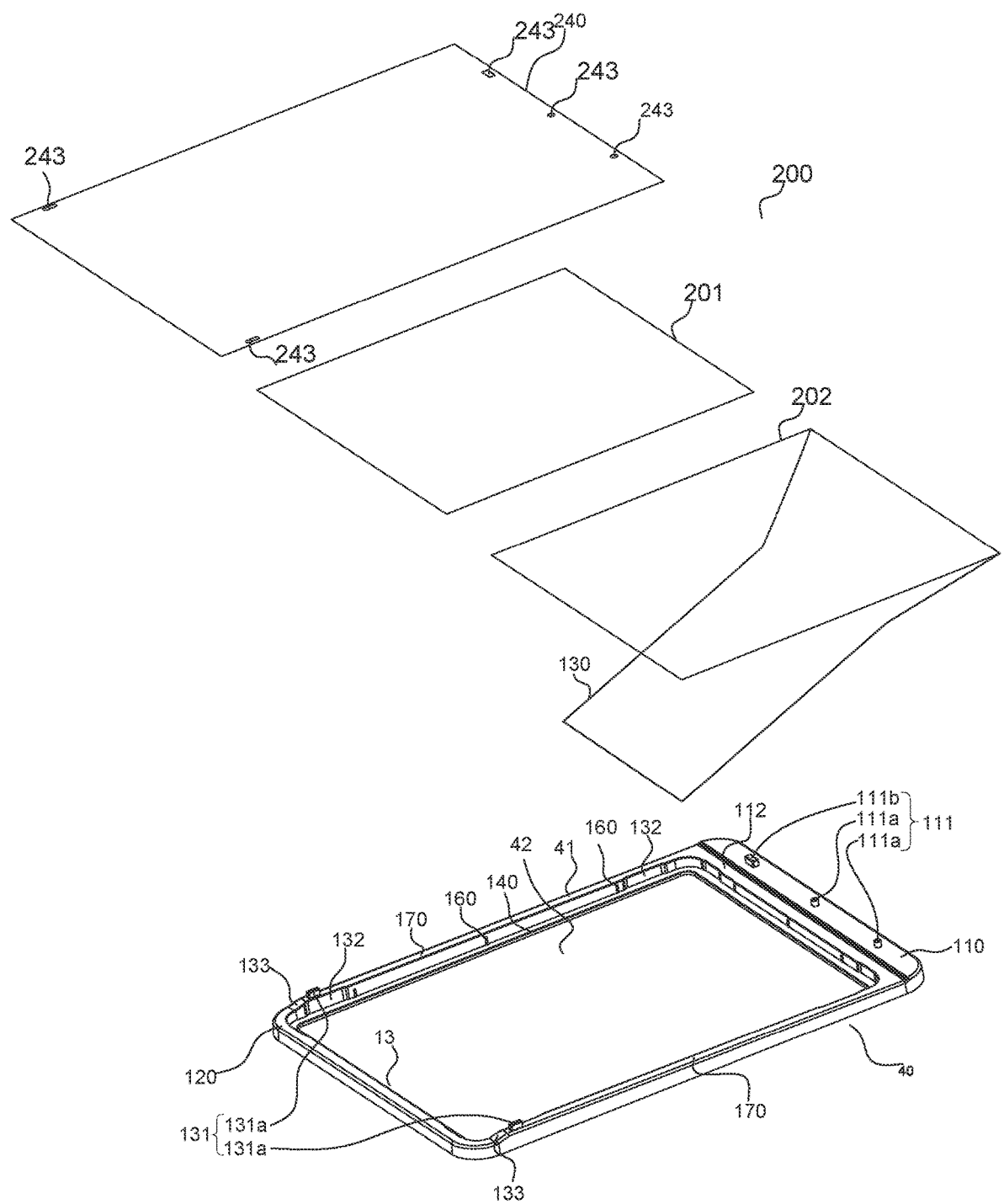
FIG. 15 is a perspective view of a film applicator according to a fifth embodiment of the present disclosure.

Referring to FIG. 15, a fifth embodiment of the present disclosure provides another film applicator 40, which is used to cooperate with the sticking film 200 of the first embodiment to be pasted to an electronic product. In an embodiment of the present disclosure, the film applicator 40 includes a main body portion, which includes a substrate 41 with a first end wall 110 and an opposite second end wall 120 in the length direction and two side walls 170 between the first end wall 110 and the second end wall 120. The first end wall 110, the second end wall 120 and the two side walls 170 form a mounting slot 42 for accommodating and mounting the electronic product. The substrate 41 further includes a fixing portion, which includes a first fixing portion 111 arranged on the first end wall 110 and a second fixing portion 131 arranged on the side wall 170. The height of the second end wall 120 is lower than the height of the first end wall 110 to form the pulling opening 13, so that when the protective layer 240 of the sticking film 200 is positioned on the first fixing portion 111 and the second fixing portion 131, the pulling portion 130 of the release film layer 202 of the sticking film 200 can cross the upper end face of the second end wall 120 and extends outwards for the user to pull.

When the first end wall 110 is higher than the second end wall 120, the frictional resistance when the release film layer 202 is pulled can be reduced. In particular, when the height difference between the first end wall 110 and the second end wall 120 is greater than or equal to the thickness of the sticking film 200, the best effect of reducing frictional resistance can be achieved, since the pressure between the pulling portion 130 and the second end wall 120 is the smallest at this time. Therefore, making the second end wall 120 lower than the first end wall 110 can ensure the release film layer 202 to be torn off by dragging the pulling portion 130 after the sticking film 200 is positioned.

In the technical solution of the present disclosure, since the second end wall 120 can leave a moving space for the pulling portion 130 of the release film layer 202, so that when the release film layer 202 is torn off, the time that the sticking surface of the sticking film 200 is exposed to the air is greatly reduced, thereby reducing the probability that the sticking surface of the sticking film 200 is contaminated with dust, and improving the sticking effect and dustproof effect.

Referring to FIG. 15, optionally, the first fixing portion 111 includes a plurality of first positioning pillars 111a, and the first positioning pillar 111a close to one of the side wall 170 is configured as a fool-proof positioning pillar 111b. The cross-sectional shape and/or the size of the fool-proof positioning pillar 111b is different from that of the other first positioning posts 111a.

The above configuration is to prevent the user from mistaking the front and back sides of the sticking film 200. Since the cross-sectional shapes of the fool-proof positioning pillar 111b and the first positioning pillar 111a are different, the first fixing portion 111 does not have an axis of symmetry parallel to the extending direction of the side wall 170. If the user rotates the sticking film 200 by 180 degree with the extension direction of the side wall 170 as the axis, the positioning member 243 is made a symmetrical transformation according to the axis. Since the first fixing portion 111 does not have an axis of symmetry parallel to the extending direction of the side wall 170, the positioning member 243 cannot be positioned on the first fixing portion 111 at this time, and the user can know that the front and back of the sticking film 200 are reversed. In addition, in order to achieve the same effect, the fool-proof positioning pillar 111b may not be provided, and it is only necessary that the first fixing portion 111 does not have an axis of symmetry parallel to the extending direction of the side wall 170, for example, the three first positioning pillars 111a are arranged on the same straight line at unequal intervals.

Referring to FIG. 15, optionally, the cross-section of the fool-proof positioning pillar 111b is rectangular, and the cross-section of the other first positioning pillars 111a is circular. This solution further refines the method that the first fixing portion 111 does not have an axis of symmetry parallel to the extending direction of the side wall 170. The cross-section of the fool-proof positioning post 111b is rectangular, so that the geometric shapes of the fool-proof positioning post 111b and the other first positioning pillars 111a are different, and the user can quickly determine the front and rear position of the sticking film 200. If the fool-proof positioning pillar 111b is not provided, although the three first positioning pillars 111a with the same geometric shape distributed on the first end wall 110 at unequal intervals can also play the role of distinguishing the front and rear of the sticking film 200, compared with the solution with the fool-proof positioning pillar 111b, the distinction between the front and rear is less obvious. In addition, the cross-section of the fool-proof positioning pillar 111b may also be in other shapes different from that of the first positioning pillar 111a. For example, the cross-section of the first positioning pillar 111a is circular, and the cross-section of the fool-proof positioning pillar 111b is oval; the cross-section of the first positioning pillar 111a is square, and the cross-section of the fool-proof positioning pillar 111b is triangular.

Referring to FIG. 15, optionally, the second fixing portion 131 includes a second positioning pillar 131 disposed close to the second end wall 120. After the protective layer 240 is positioned on the first fixing portion 111 and the second fixing portion 131, when the user pulls the pulling portion 130 of the release film layer 202 to tear off the release film layer 202, ideally, the tearing force should be perpendicular to the extending direction of the first end wall 110, so that even only the first fixing portion 111 is sufficient to position the protective layer 240 well. However, in practice, the tearing force may not be perpendicular to the extending direction of the first end wall 110. In this case, the force on the sticking film 200 is not zero relative to the torque of the normal line of the upper end face of the first end wall 110 passing through the midpoint of the extending direction thereof, which will cause the torque of the sticking film 200 to be too large relative to the normal line, and cause the sticking film 200 to be distorted and deformed, destroying the positioning relationship between the protective layer 240 and the "first fixing portion 111 and the second fixing portion 131", causing the positioning to fail. The arrangement of the second fixing portion 131 can solve this problem. Since the second fixing portion 131 is on the side wall 170, when the sticking film 200 has a tendency of rotating, the second fixing portion 131 can give the protective layer 240 a torque that prevents the rotation of the sticking film 200. It can be seen from the geometric relationship that the closer the protective layer 240 is to the second end wall 120, or the further the protective layer 240 is from the first end wall 110, the larger the torque that can be provided to prevent the sticking film 200 from twisting is. However, it does not exclude that the second fixing portion 131 is disposed in the middle of the side wall 170 or close to the first end wall 110, the effect of preventing the twisting of the sticking film 210 can still be achieved, but the ability to prevent twisting is lower than that the second fixing portion 131 is disposed close to the second end wall 120.

Referring to FIG. 15, optionally, the height of the side wall 170 ranges from the height of the first end wall 110 to the height of the second end wall 120. If the height of the side wall 170 is greater than that of the first end wall 110, after the protective layer 240 is positioned on the first fixing portion 111 and the second fixing portion 131, since the second fixing portion 131 is positioned on the side wall 170, the overall highest height of the sticking film 200 is equal to the height of the side wall 170, and the highest height of the sticking film 200 is greater than that of the first end wall 110 in this case. In addition, since the first fixing portion 111 is distributed on the first end wall 110, the positioning member 243 cooperated with the first fixing portion 111 is not inserted into the bottom of the first positioning pillar 111a, and such a cooperation method is less reliable. If the height of the side wall 170 is lower than that of the second end wall 120, the lowest point of the sticking film 200 is lower than the height of the second end wall 120. In this case, the pulling portion 130 and the second end wall 120 will have pressure, which makes it inconvenient to tear off the release film layer 202. In conclusion, only when the height of the side wall 170 ranges from the height of the first end wall 110 to the height of the second end wall 120 can the effect that the protective layer 240 is fully combined with the first fixing portion 111, and there is no pressure between the pulling portion 130 and the second end wall 120 be achieved.

Referring to FIG. 15, optionally, a transition slope 133 is provided between the upper end face of the side wall 170 and the upper end face of the second end wall 120. As mentioned above, the height of the side wall 170 is greater than that of the second end wall 120, so the transition slope 133 can be provided to make a smooth transition between the side wall 170 and the second end wall 120. In addition, all the planes on the substrate are smoothly transitioned, so that the surface of the electronic product will not be scratched due to the sharp edges and corners of the film applicator 40 during the installation or removal process, and user's hands will not be scratched while using.

Referring to FIG. 15, optionally, the upper end face of the first end wall 110 defines an avoidance step 112 on the side close to the second end wall 120 to provide space for the connection between the release film layer 202 and the pulling portion 130. Since the release film layer 202 needs to be torn off after the sticking film 200 is positioned on the first fixing portion 111 and the second fixing portion 131, the adhesive strength between the release film layer 202 and the tempered film 201 should not be too large, which makes that if the initial end of the pulling portion 130 is on the edge of the sticking film 200, the release film layer 202 will be torn off easily. Therefore, the initial end of the pulling portion 130 is a certain distance away from the edge of the sticking film 200. If the first end wall 110 does not define the avoidance step 112, the first end wall 110 and the pulling portion 130 will be under pressure, which increases the resistance to tearing off the release film layer 202. In particular, the height of the avoidance step 112 should not be greater than the height of the screen of the electronic product accommodated in the mounting slot 42, so as to ensure sufficient avoidance. In addition, the height difference between the upper end face of the first end wall 110 and the avoidance step 112 should be greater than or equal to the sum of the thicknesses of the protective film 220 and the release film layer 202, so that the protective layer 240 does not squeeze the pulling portion 130 to increase the resistance when the release film layer 202 is torn off.

Referring to FIG. 15, optionally, the bottom of the mounting slot 42 is provided with an annular supporting edge 140. When only the first end wall 110, the second end wall 120 and the side wall 170 constitute the mounting slot 42, the mounting slot 42 is easily deformed when subjected to forces from all directions on the same plane as the mounting slot 42. The addition of the annular supporting edge 140 at the bottom of the mounting slot 42 can increase the thickness of the mounting slot 42 in the plane direction, so that the mounting slot 42 is not easily deformed when subjected to a force on the same plane as the mounting slot 42. If the mounting slot 42 is deformed, the electronic product cannot be normally accommodated and mounted. In addition, the supporting edge 140 can also play a role in limiting the position of the electronic product. When the electronic product is accommodated and mounted in the mounting slot 42, the back of the electronic product abuts against the supporting edge 140, so that the electronic product does not sink excessively, and the relative position between the mounting slot 42 and the electronic product remains unchanged.

Referring to FIG. 15, optionally, the inner side of at least one of the first end wall 110, the side wall 170 and the second end wall 120 is provided with an avoidance groove 132, which is used to accommodate the side buttons of the electronic product. Electronic products have side buttons, which protrude from the side of the device. If there is no avoidance groove 132, the mounting slot directly abuts with the side buttons of the electronic product to achieve the effect of positioning the electronic product. After the additional avoidance groove 132 accommodates the side buttons, the mounting slot abuts against the side of the electronic product without buttons to achieve the effect of positioning the electronic product.

It can be understood that the pulling opening 13 can also be formed on the first end wall 110 or the side wall 170. The first end wall 110, the second end wall 120 and the two side walls 170 support the sticking film, and the pulling portion 130 overlaps the upper surface of the first end wall 110 or one of the two side walls 170 that forms the pulling opening 13.

Referring to FIG. 15, the inner surfaces of the first end wall 110, the second end wall 120 and the two side walls 170 are provided with protrusions 160, which are connected with the side surfaces of the electronic product. The contact of the protrusion 160 and the outer surface of the electronic product is changed from surface contact to point contact, which reduces the contact area between the film applicator 40 and the side wall 170 of the electronic product, reduces the possibility of being damaged by friction, and protects the electronic product.

Optionally, the material of the substrate 41 can be, but not limited to, paper, wood, degradable plastic, metal, ceramic, or non-degradable plastic. In this embodiment, the substrate 41 is made of degradable plastic.

Figure 16:
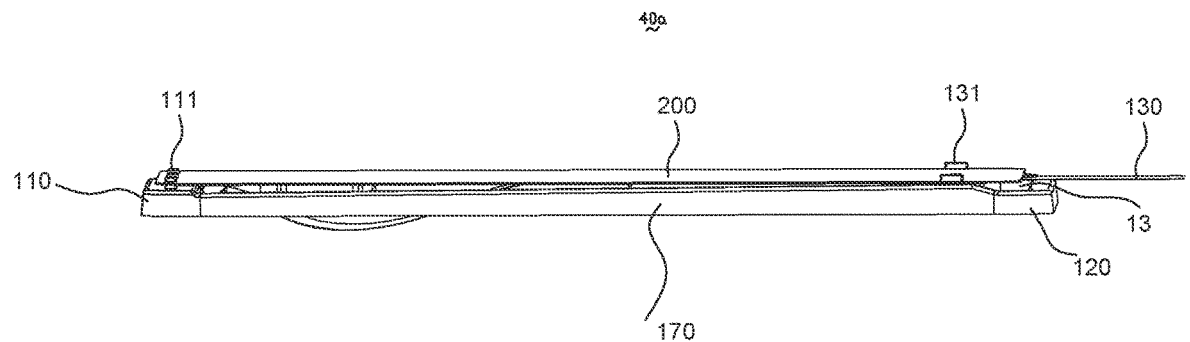
FIG. 16 is a perspective view of a film applicator cooperated with the sticking film according to a sixth embodiment of the present disclosure.

Referring to FIG. 16, a sixth embodiment of the present disclosure provides a film applicator 40a, which is different from the film applicator 40 of the fifth embodiment in that the side wall 170 has an inclined angle relative to the horizontal plane, the height of the side wall relative to the horizontal plane gradually increases from the first end wall 110 to the second end wall 120, and the heights of the first end wall 110 and the second end wall 120 are equal. The first fixing portion 111 is arranged on the first end wall 110, the second fixing portion 131 is arranged on the two side walls 170, and the pulling opening 13 is formed on the second end wall 120. The sticking film 200 is positioned on the upper surfaces of the first end wall 110 and the two side walls 170, the first end wall 110 and the two side walls 170 support the sticking film 200, and the side wall 170 at the end with a higher height from the horizontal plane raises the sticking film 200, so that there is a certain distance between the sticking film 200 and the screen of the electronic device to form the pulling opening 13 for the pulling portion 130 to extend.

Figure 17:
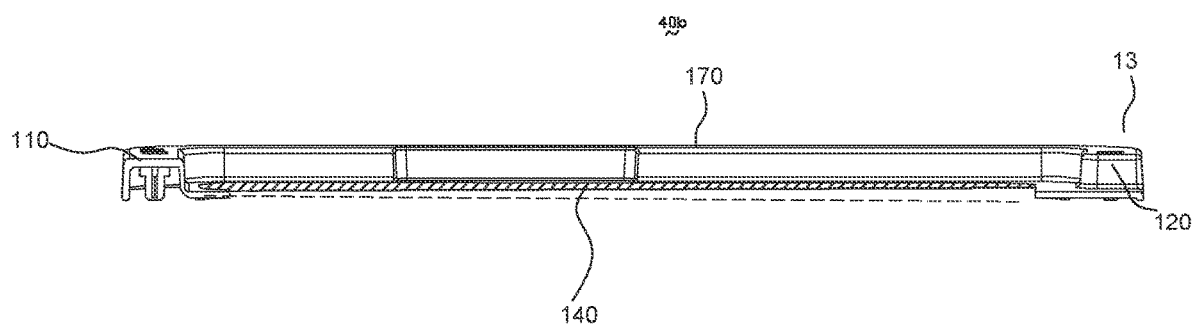
FIG. 17 is a cross-sectional view of another film applicator according to a seventh embodiment of the present disclosure.

Referring to FIG. 17, a seventh embodiment of the present disclosure provides a film applicator 40b, which is different from the film applicator 40a of the sixth embodiment in that the two side walls 170 are horizontally arranged relative to the horizontal plane, and the height of the support edge 140 relative to the horizontal plane decreases from the first end wall 110 to the second end wall 120. The two side walls 170 are at the same height from the horizontal plane, and the pulling opening 13 is formed on the second end wall 120, after positioning the sticking film 200, there is a height difference between one end of the release film layer 202 relative to the electronic device and the other end of the release film layer 202 relative to the electronic device.

Figure 18:
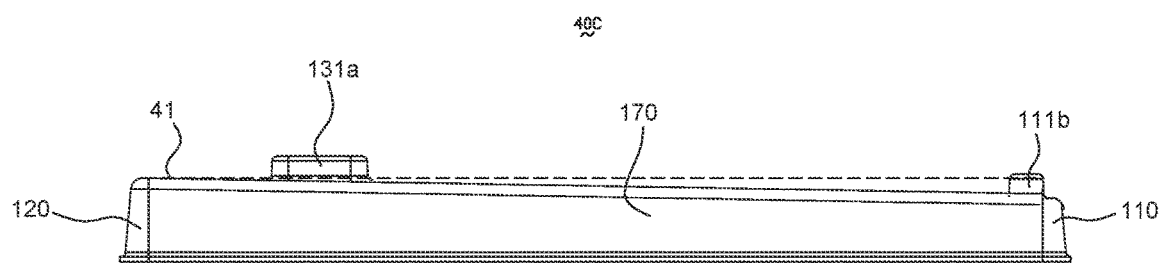
FIG. 18 is a front view of another film applicator according to an eighth embodiment of the present disclosure.
Figure 19:
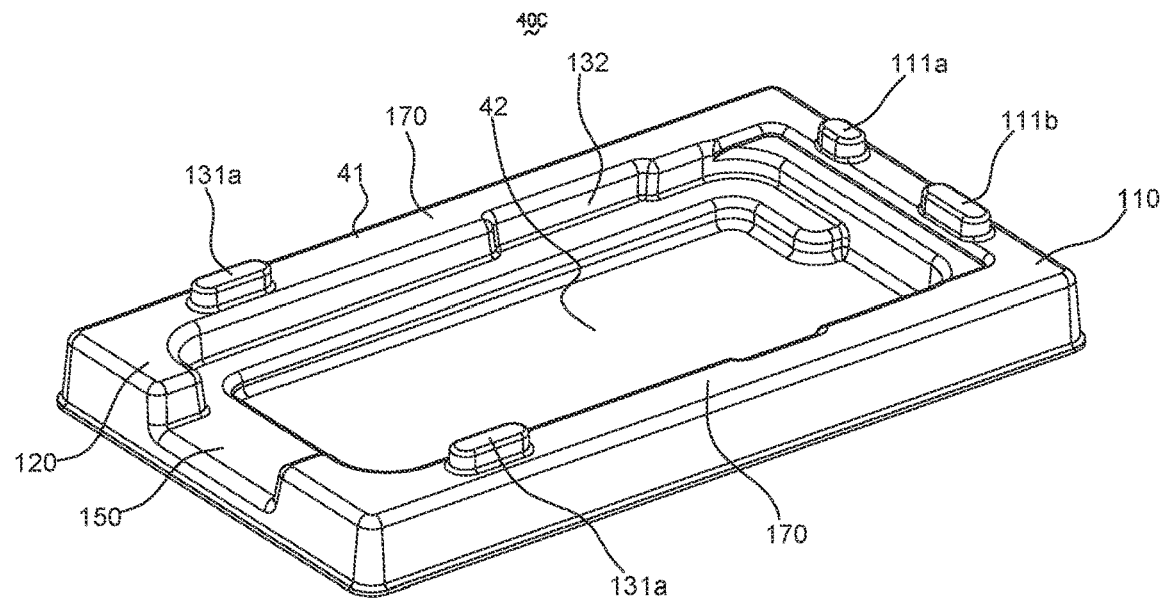
FIG. 19 is a perspective view of another film applicator according to the eighth embodiment of the present disclosure.
Figure 20:
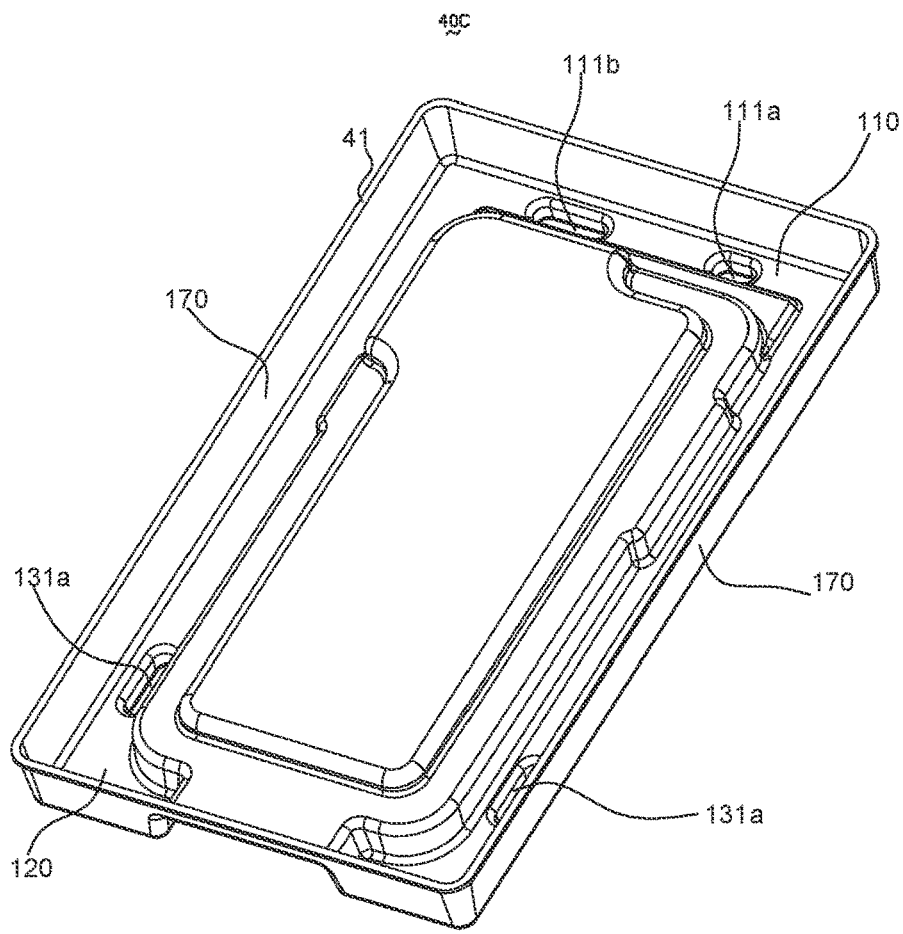
FIG. 20 is a perspective view of another angle of the film applicator according to the eighth embodiment of the present disclosure.
Figure 21:
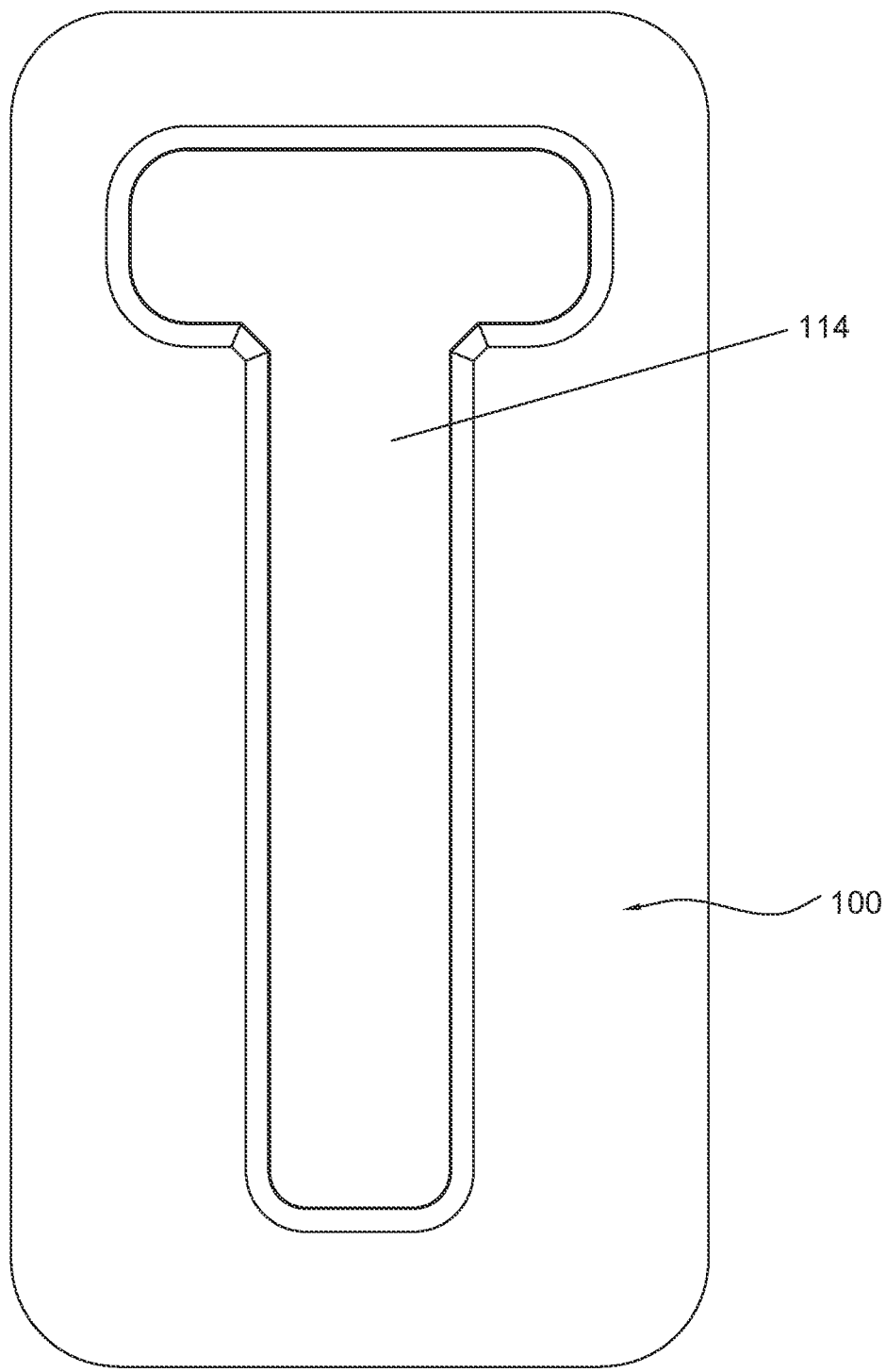
FIG. 21 is a rear view of a film applicator according to a ninth embodiment of the present disclosure.

Referring to FIG. 18 to FIG. 20, an eighth embodiment of the present disclosure provides a film applicator 40c, which is different from the film applicator 40 of the fifth embodiment mainly in that the difference in the materials for preparing the film applicator 40c. Based on the difference of materials, the sizes of the first end wall 110, the second end wall 120, and the side wall 170 are further set relatively large to ensure smooth demolding and improve the strength thereof.

Optionally, the upper end face of the side wall 170 is gradually inclined upward from the upper end face of the first end wall 110 toward the upper end face of the second end wall 120. In this case, the upper end faces of the first end wall 110 and the second end wall 120 are a flat surface or an extension surface of the upper end face of the side wall 170. In the side view shown in FIG. 18, the dashed-dotted line is a reference line parallel to the lower end face of the side wall 170, and the inclined form of the upper end face of the side wall 170 can be seen. In practice, the inclination of the side wall 170 may be much smaller than the inclination shown in the figure, since the thickness of the sticking film 200 is very small relative to the distance between the first end wall 110 and the second end wall 120. The height difference between the height of the first end wall 110 and the height of the second end wall 120 only needs to be greater than or equal to the thickness of the sticking film 200, so that a moving space can be reserved for the pulling portion 130. That is, there is a distance between the screen and the release film layer 202. The upper end face is an inclined surface connecting the upper end face of the first end wall 110 and the upper end face of the second end wall 120, and the tangent value of the inclination angle of the upper end face of the side wall 170 is at least equal to the thickness of the sticking film 200 divided by the distance between the first end wall 110 and the second end wall 120, which can be seen that this is a small angle. The beneficial effect of this arrangement is that the integrity of the substrate 41 is improved. If the substrate 41 is produced by a stamping method, it is beneficial to improve the success rate of stamping; if the substrate 41 is produced by an injection molding method, it is beneficial to improve the simplicity of mold manufacturing.

Referring to FIG. 19, optionally, the second end wall 120 includes a pulling slot 150, which prevents the second end wall 120 from abutting against the electronic product at the position of the pulling slot 150. In this case, a portion of the side of the electronic product is accessible to the user. After the process of sticking is finished, the electronic product can be taken out from the mounting slot 42 by pulling the portion of the electronic product. Without the pulling slot 150, the electronic product needs to be poured out of the mounting slot 42, which may easily cause the electronic product to fall. Therefore, the pulling slot 150 increases the convenience and safety when taking out the electronic product.

Referring to FIG. 15 and FIG. 19 again, the second fixing portion 131 disposed on the side wall 170 and close to the pulling opening 13 is movably matched with the positioning member 243, and first fixing portion 111 disposed on the first end wall 110 is closely matched with the positioning member 243. In this case, the sticking film can be well pre-positioned on the first end wall 110, and then the sticking film can be further positioned by aligning with the second fixing portion 131. By arranging the connection method between the sticking film and the film applicator 40 to be tightly matched at one end and flexibly connected at another end, the sticking film can be well positioned while aligning, and a reasonable error caused by the sticking film or the film applicator 40 in the preparation process is allowed, which reduces the precision requirement of the preparation process.

Referring to FIG. 18 to FIG. 20, the material of the substrate 41 of the film applicator 40c is paper. Using paper, wood or degradable plastic, after the substrate 41 is discarded, it can be quickly decomposed into small molecular substances in nature, returning to the carbon cycle of the earth, avoiding the waste of resources, and avoiding the ecological damage caused by the accidental eating of artificial objects by wild animals. In addition, the use of degradable materials such as paper has low cost and simple processing, which is more conducive to reducing production costs. Further, after the electronic product is accommodated and installed in the substrate, and the outer release paper is positioned, the structure will not change, so the substrate can be reused, which further increases the environmental protection property of the substrate.

Referring to FIG. 15 and FIG. 19, optionally, the bottom of the mounting slot 42 in FIG. 15 is provided with the annular supporting edge 140 to increase the strength of the substrate 41, while the bottom of the mounting slot 42 in FIG. 16 is a closed structure, which is because the substrate 41 in FIG. 15 is made of degradable plastic, the material itself has high strength, and the strength of the base 41 only needs to be supplemented by the annular support edge 140; while the substrate 41 in FIG. 19 is made of paper, the material strength is low, and the slot bottom is configured as a closed structure to ensure the strength thereof. In addition, the substrate 41 in FIG. 15 is injection-molded, and the slot bottom is not closed, which can save materials and reduce costs; the substrate 41 in FIG. 19 is formed by stamping, and the material itself is closed. If the bottom of the slot is to be hollow, a shearing step needs to be added, which is the reason that the closed structure is configured to save the manufacturing cost.

Referring to FIG. 21 to FIG. 24, a ninth embodiment of the present disclosure provides a film applicator 50, which includes a main body portion provided with a substrate 100. The substrate 100 includes a connecting plate 501, a positioning edge 502 and a fixing portion 112 that are arranged on the same surface of the connecting plate 501. The positioning edge 502 forms a mounting slot 180 that is used for positioning the electronic product and the sticking film 200. The side wall of the mounting slot 180 is provided with a pulling opening 13 that is used for passing through the puling portion 130 on the release film layer 202 of the sticking film 200.

Specifically, the mounting slot 180 is provided on the substrate 100. When using the substrate 100 to film the electronic product, the sticking film 200 is first installed on the bottom of the mounting slot 180, so that the release film layer 202 of the sticking film 200 faces the notch of the mounting slot 180, then insert the pulling portion 130 through the pulling opening 13, and then install the electronic product into the mounting slot 180 of the substrate 100 in the direction that the screen of the electronic product faces the sticking film 200, finally pull the pulling portion 130 to tear off the release film layer 202 from the tempered film 201, and attach the tempered film 201 to the screen of the electronic product. Since the film-sticking process of the electronic product is carried out in a sealed environment formed by the electronic product, the sticking film 200 and the mounting slot 180, it can effectively prevent impurities such as dust in the air from entering the screen of the electronic product, thereby preventing the generation of air bubbles between the tempered film 201 and the screen due to the existence of impurities. In addition, the sticking film 200 and the electronic product are installed in the mounting slot 180 simultaneously, so that the screen of the sticking film 200 and the electronic product can be automatically aligned, so as to prevent the dislocation of the sticking film 200 and the screen of the electronic product. Further, the film applicator 50 can be reused, if the sticking film 200 is damaged during use, users can just buy the sticking film 200 and install it in the film applicator 50 to perform the sticking operation, without repurchasing a new film applicator 50. It can be seen that the technical solution of the present disclosure is not only simple to operate and has a higher performance, but can also improve the film-sticking effect and dust-removal effect of electronic products, and the film applicator can be reused.

Further, the electronic product may be a pad, a mobile phone, a watch, or the like, and the type of the electronic product is not specifically limited here.

Optionally, the positioning edge 502 includes two opposite first positioning edges 5021 and two opposite second positioning edges 5022, and the two first positioning edges 5021 and the two second positioning edges 5022 are connected end to end to define the mounting slot 180. The connecting plate 501 includes a first side and a second side in the length direction or in the width direction thereof, the first positioning edges 5021 are arranged on both sides of the connecting plate 501 in the length direction thereof, and the second positioning edges 5022 are arranged on one side of the connecting plate 501 in the width direction thereof. Each of the second positioning edges 5022 is connected to the end of one of the first positioning edges 5021. The two second positioning edges 5022 are oppositely arranged with a certain interval therebetween to form the notch 113. The notch 113 is also formed at the other end opposite to the second positioning edge 5022 since the second positioning edge 5022 is not provided. The second positioning edge 5022 is formed by the end of the first positioning edge 5021 extending a distance along the width direction of the connecting plate 501. Optionally, the pulling opening 13 is disposed at the bottom of the side wall of the slot. That is, the pulling opening 13 is disposed at the connection between the second positioning edge 5022 and the connecting plate 501. The pulling portion 13 can be formed by cutting off part of the second positioning edge 5022 to form a gap existed between the second positioning edge 5022 and the surface of the connecting plate 501. It can be understood that the sticking film 200 is installed at the bottom of the mounting slot 180, and the pulling opening 13 is arranged at the bottom of the side wall of the slot, which can make the release film layer 202 of the sticking film 200 straight out of the substrate 100, so as to prevent the dislocation of the sticking film 200 caused by the deflection of the release film layer. Of course, the present disclosure is not limited to this, in other embodiments, the pulling opening 13 may also be disposed on the edge of the bottom wall of the slot.

Optionally, the edge of the mounting slot 180 is provided with a positioning structure, which is used for the positioning and installation of the protective layer 240 of the sticking film 200. Specifically, the positioning structure is to match the positioning portion on the protective layer 240 of the sticking film 200 to position the sticking film 200, which prevents the sticking film 200 from being displacement relative to the screen of the electronic product, and achieves precise positioning of the components of the sticking film 200 to prevent the sticking film 200 from being damaged.

Optionally, the positioning structure includes a plurality of fixing portions 112, and each of the opposite sides of the mounting slot 180 is provided with a portion of the fixing portions 112. That is, the fixing portions 112 are arranged at the positions of the two notches 113. At least one fixing portion 112 is configured as a fool-proof convex portion 112a, and the cross-sectional size and/or the shape thereof is different from that of the other fixing portions 112. Specifically, the protective layer 240 of the sticking film 200 is also provided with positioning holes and fool-proof hole correspondingly. It can be understood that at least one fixing portion 112 is configured as a fool-proof convex portion 112a to prevent the user from reversing the front and rear order of the components of the sticking film 200, resulting in installation errors. In addition, the fixing portion 112 has a simple structure and is easy to process. Of course, the present disclosure is not limited to this, in other embodiments, the positioning structure may also include a plurality of positioning concave portions, and corresponding fixing portions are provided on the protective film layer of the sticking film 200.

Optionally, the fool-proof convex portion 112a is arranged in a cylindrical shape, or in a long strip-shaped convex rib. Specifically, the shape of the fixing portion 112 can be configured to a circle, or can be configured to other shapes such as a square, a prism, etc., which is not specifically limited here. The obvious cylindrical or long strip-shaped convex rib is selected so that the user can clearly distinguish the front and rear of the sticking film 200, and quickly and accurately position the sticking film 200.

The fixing portion 112 is arranged on the edge of the mounting slot 180, and the size of the mounting slot 180 needs to be larger than the size of the electronic product. The notch 113 is provided on the side wall of the slot for the fixing portion 112 to be installed, which prevents additional size increase of the substrate 100, and is beneficial to reduce the size of the substrate 100 and increase the compactness of the structure of the film applicator 50. Each of the notches 113 is provided with part of the fixing portion 112 for fixing the sticking film 200 from the opposite side, which can increase the stability of the positioning of the sticking film 200. Furthermore, the fixing portion 112 is arranged at the notches 113 of the two short slot walls, which can fix the two further sides of the sticking film 200, and increase the stability of the sticking film 200. Of course, the present disclosure is not limited to this, in other embodiments, the side slot walls may also include four slot walls with equal side lengths. In this case, the notches 113 can be arranged on the opposite slot walls.

Referring to FIG. 22 again, the pulling opening 13 is arranged on a short slot wall and communicates with the notch 113 disposed at the same short slot wall. It can be understood that the pulling opening 13 and the notch 113 are arranged to communicate with each other, so that when the sticking film 200 is installed, the pulling portion 130 will automatically enter the pulling opening 13 through the notch 113, and the user does not need to manually pull the pulling portion 130 into the pulling opening 13, which increases the installation efficiency of the sticking film 200 and increases the efficiency of film sticking.

Optionally, the notch 113 that communicates with the pulling opening 13 is provided with the fixing portion 112 arranged in the middle of the notch 113, so that the middle portion of the side of the sticking film 200 can be fixed to increase the stability of the positioning of the sticking film 200.

Optionally, the bottom of the mounting slot 180 is provided with an operation opening 114 penetrating the mounting slot 180. Specifically, the operation opening 114 is used for the user's hand to press the sticking film 200 to paste the sticking film 200 on the electronic product. The film-sticking method is simple and easy to operate, and it is not easy to generate air bubbles that affect the display effect of the electronic product between the sticking film 200 and the screen of the electronic product. The user can observe the specific condition of the film sticking through the operation opening 114.

Optionally, the side wall of the slot is provided with a material reduction slot 1801 that opens toward the outside of the mounting slot 180. It can be understood that the arrangement of the material reduction slot can not only reduce the material consumption of the film applicator 50, but also reduce the weight of the film applicator 50 to achieve the purpose of reducing the cost of the film applicator 50.

As a variant embodiment, the fixing portion 112 may be arranged at one of the notches 113, that is, at one end of the connecting plate 501 in the width direction.

Figure 22:
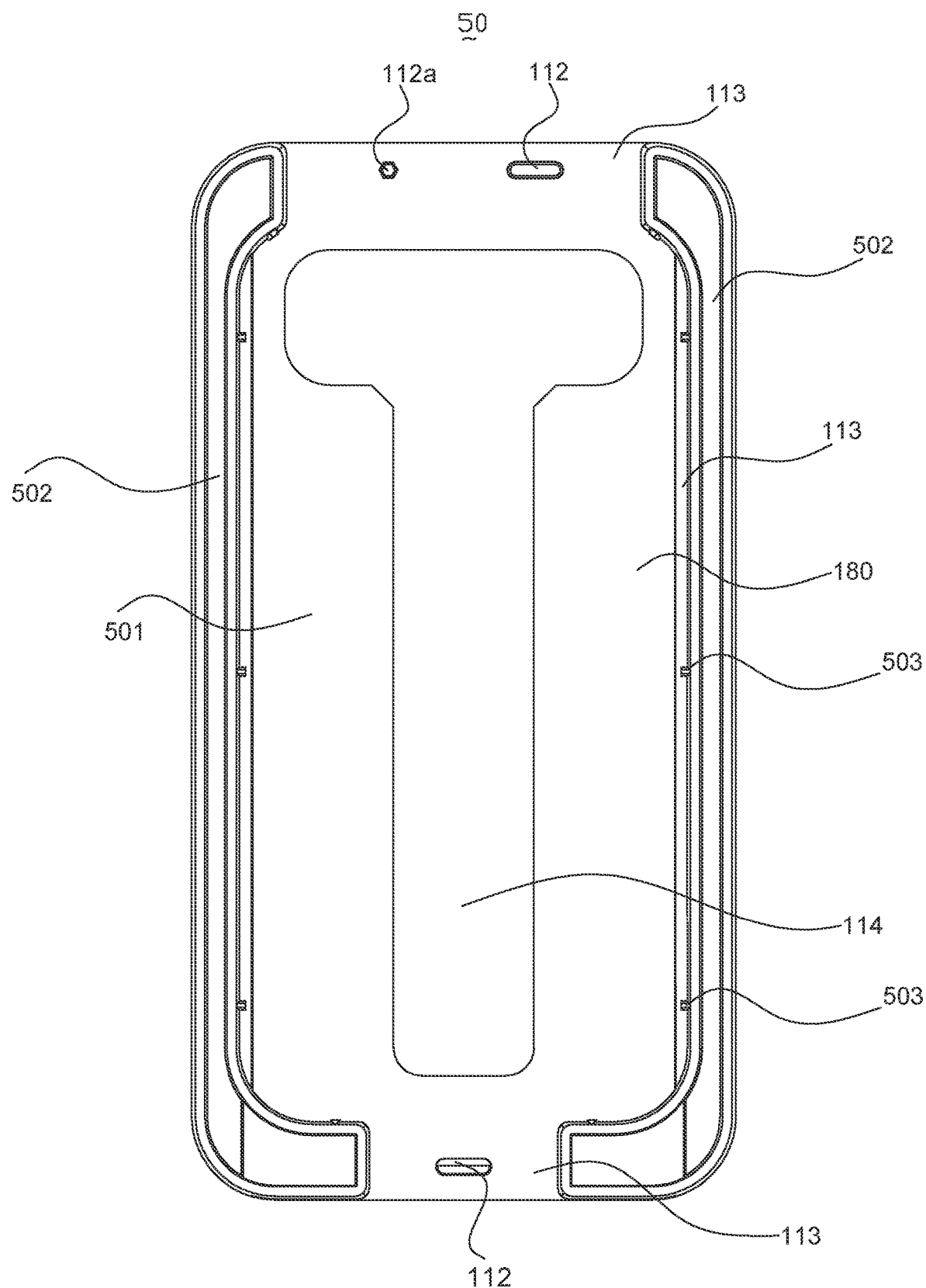
FIG. 22 is a front view of the film applicator according to the ninth embodiment of the present disclosure.
Figure 23:
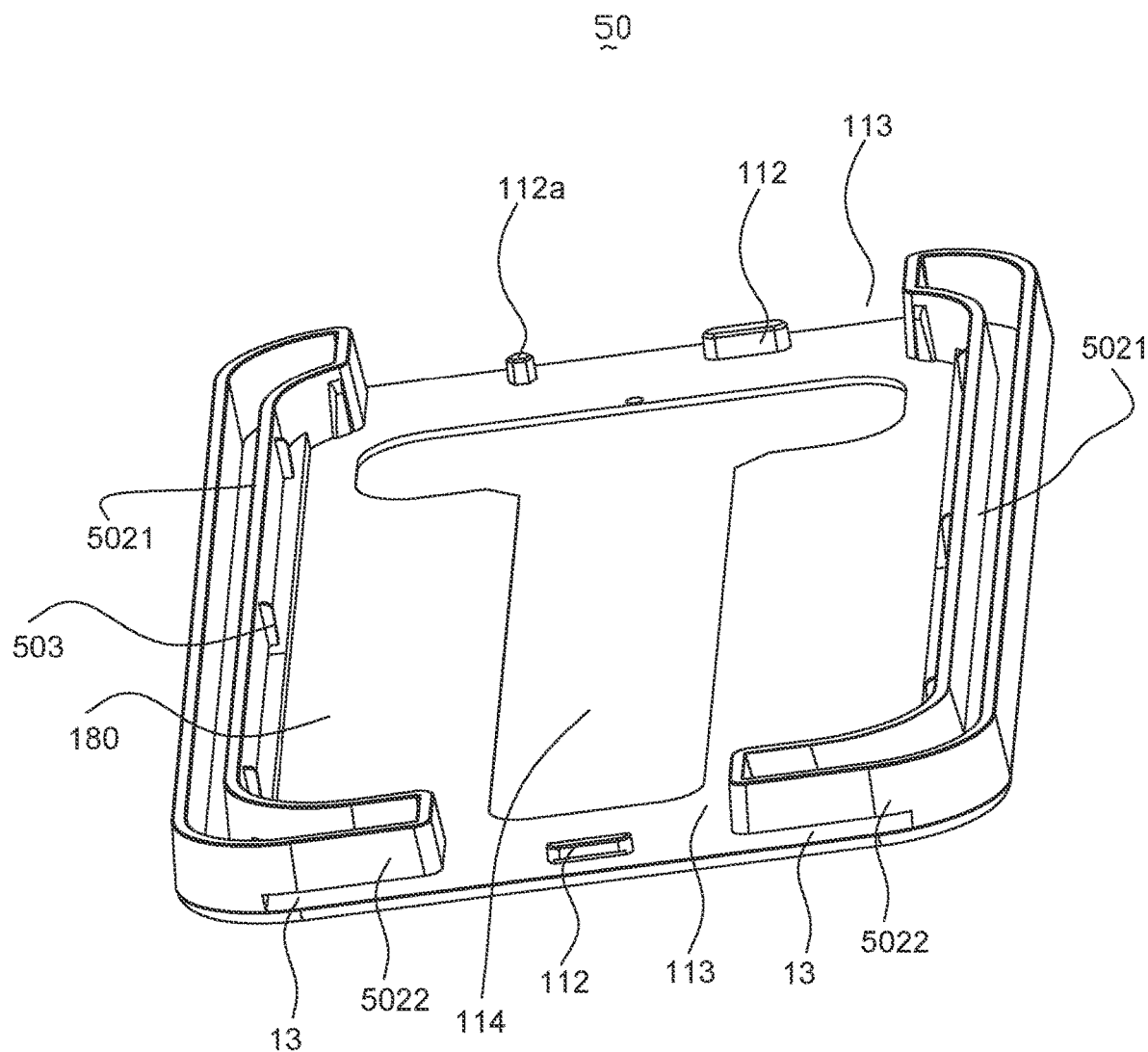
FIG. 23 is a perspective view of the film applicator according to the ninth embodiment of the present disclosure.
Figure 24:
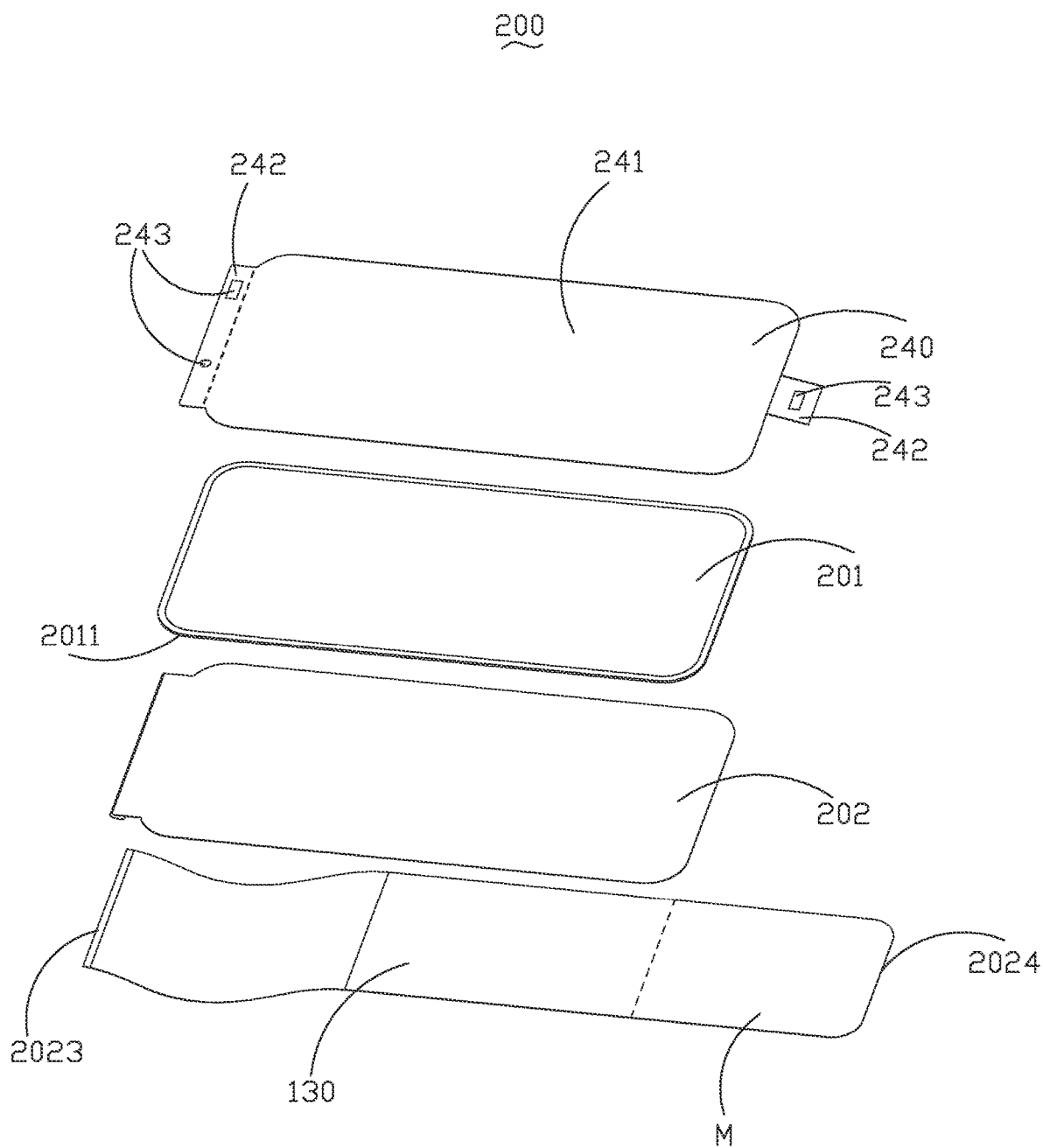
FIG. 24 is an exploded view of a sticking film according to the present disclosure for adapting to the film applicator of the ninth embodiment.

Referring to FIG. 22 and FIG. 23, the inner wall of the positioning edge 502 is provided with a supporting edge 503 to contact the edge of the screen of the electronic product, and the supporting edge 503 protrudes from the surface of the connecting plate 501 so that there is a distance between the release film layer 202 and the screen to tear off the release film layer 202 smoothly through the pulling portion 130.

Figure 25:
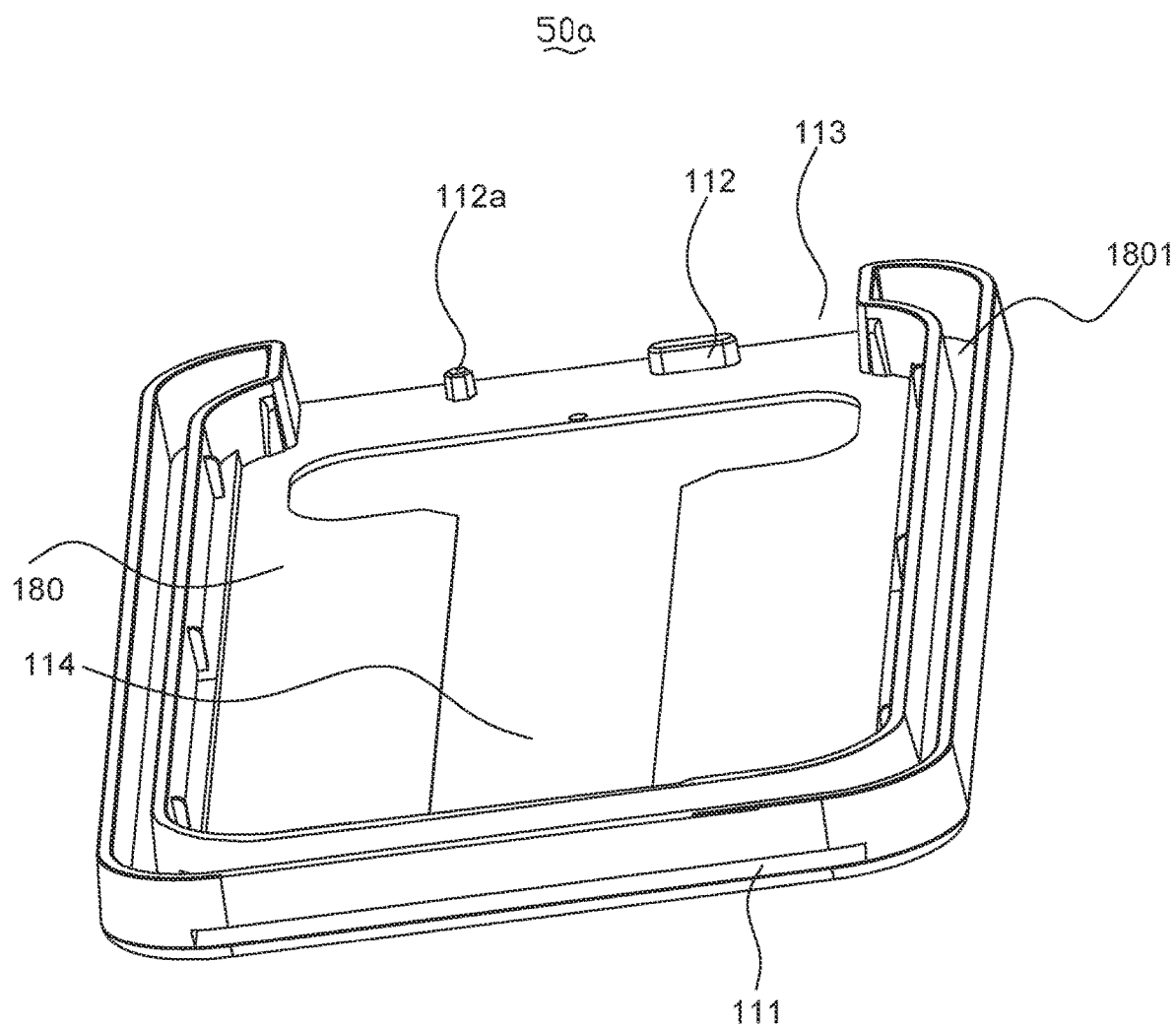
FIG. 25 is a perspective view of a film applicator according to a tenth embodiment of the present disclosure.

Referring to FIG. 25, a tenth embodiment of the present disclosure provides a film applicator 50a, which is different from the film applicator 50 of the eighth embodiment in that the two second positioning edges 5022 are connected, and there is no notch therebetween.

Figure 26:
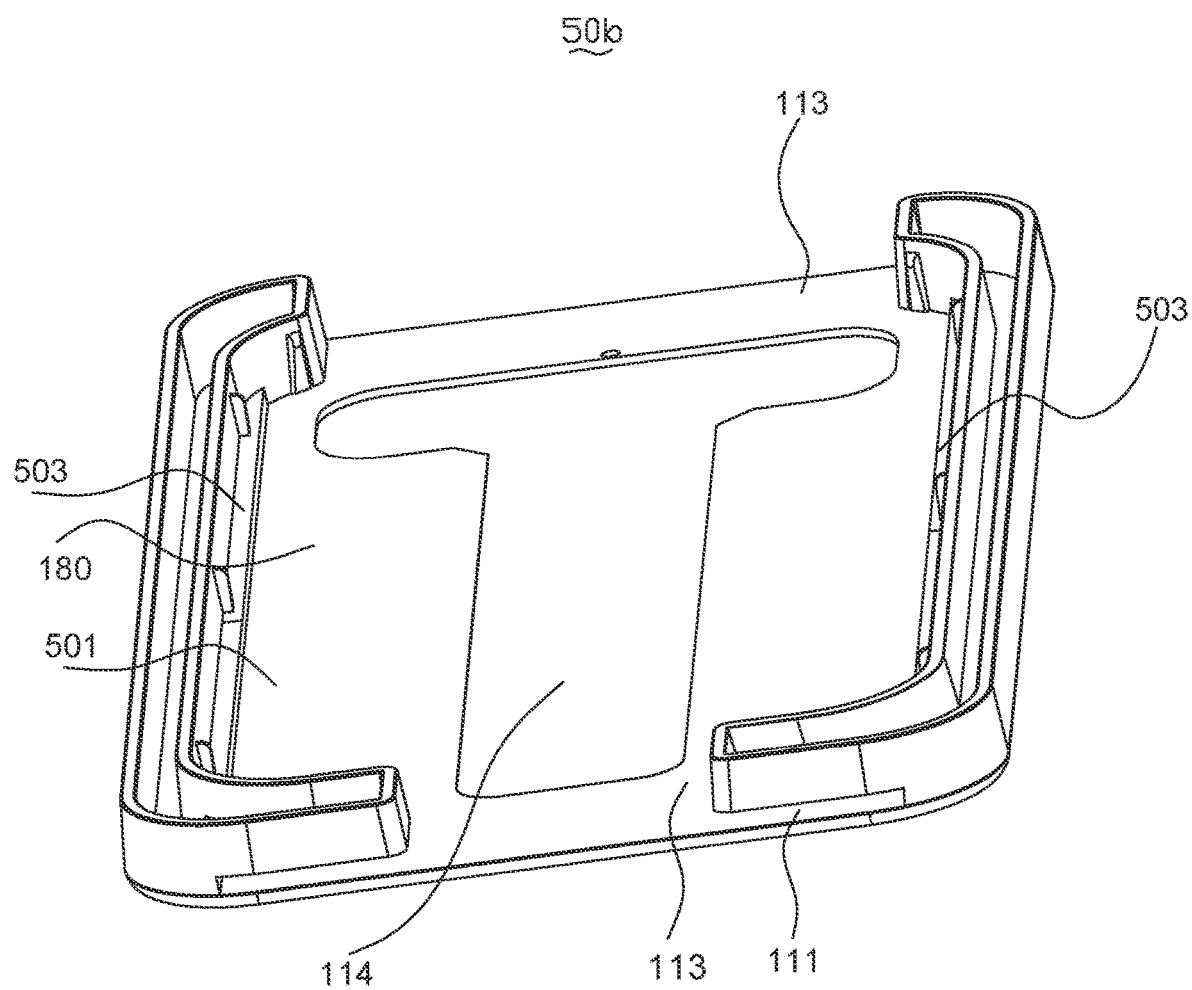
FIG. 26 is a perspective view of a film applicator according to an eleventh embodiment of the present disclosure.

Referring to FIG. 26, an eleventh embodiment of the present disclosure provides a film applicator 50b, which is different from the film applicator 50 of the eighth embodiment in that the space enclosed by the supporting edges 503 matches the outline size of the sticking film 200. The supporting edge 503 is the fixing portion for positioning the film, and the sticking film 200 is positioned in the space enclosed by the supporting edges 503. That is, the fixing portions arranged in the two notches 113 are not provided. It can be understood that, as an option, in order to better position the electronic product, the positioning edges 502 may also be arranged at both ends of the connecting plate 501 in the width direction.

Figure 27:
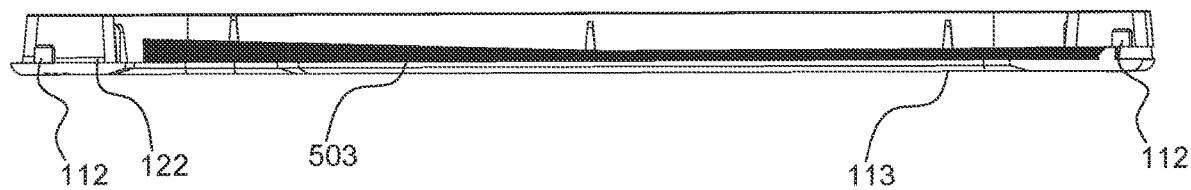
FIG. 27 is a cross-sectional view of a film applicator according to a twelfth embodiment of the present disclosure.

Referring to FIG. 27, a twelfth embodiment of the present disclosure provides a film applicator 50c, which is different from the film applicator 50 of the eighth embodiment in that the support edges 503 are arranged to be inclined relative to the horizontal plane. After the electronic product is positioned in the mounting slot 180 and the sticking film is positioned by the fixing portion 112, there is a height difference between the two ends of the release film layer 202 in the length direction or the two ends in the width direction relative to the opposite ends of the electronic device. During the film-sticking process, the end of the tempered film 201 that is lower from the screen is first contacted with the screen of the electronic product, and then the film is pasted from this end to the opposite end. The direction of the film sticking is fixed, which can well discharge air bubbles.

The fixing portion 112 is arranged on the two notches 113, the fixing portion 112 corresponding to the side with a higher inclination is movably matched with the positioning member 243, and the fixing portion 112 corresponding to the side with a lower inclination is closely matched with the positioning member 243. Thus, the tempered film 201 on the side with the higher inclination can be prevented from falling off automatically during the film sticking-process. After the release film layer 202 is torn off, the release film layer 202 is dropped by pressing the operation opening 114 to control the direction of the film sticking well.

Referring to FIG. 27 again, in order to further ensure that the tempered film 201 on the higher side falls off later, a sticking region 122 is further provided at this end to further increase the stability of the connection.

Figure 28:
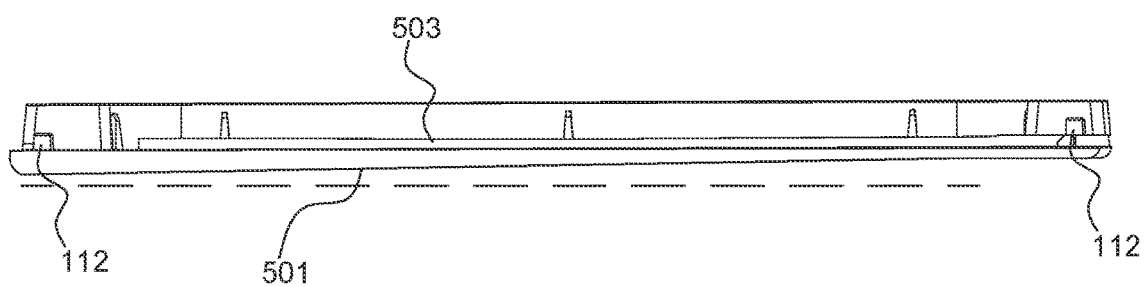
FIG. 28 is a cross-sectional view of a film applicator according to a thirteenth embodiment of the present disclosure.

Referring to FIG. 28, a thirteenth embodiment of the present disclosure provides a film applicator 50d, which is different from the film applicator 50 of the eleventh embodiment in that the opposite ends of the connecting plate 501 provided with the fixing portion 112 are arranged inclined relative to the horizontal plane, and the supporting edge 503 is horizontal relative to the horizontal plane. After the electronic product is positioned in the mounting slot 180 and the sticking film is positioned by the fixing portion 112, the two ends of the release film layer 202 in the length direction or in the width direction have a height difference relative to the opposite ends of the electronic device. During the film-sticking process, the end of the tempered film 201 that is lower from the screen is first contacted with the screen of the electronic product, and then the film is pasted from this end to the opposite end. The direction of the film sticking is fixed, which can well discharge air bubbles.

Figure 29:
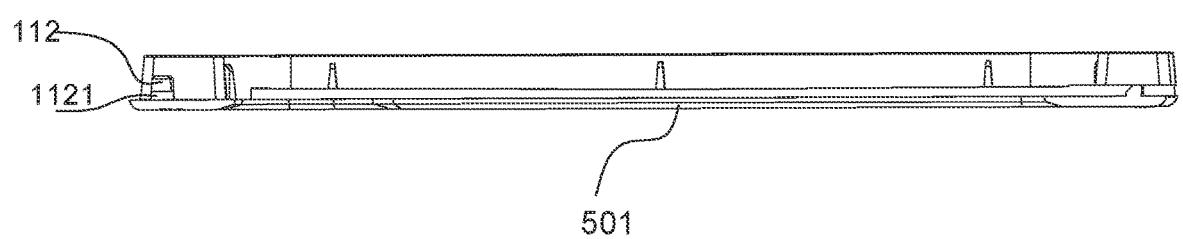
FIG. 29 is another cross-sectional view of the film applicator according to the thirteenth embodiment of the present disclosure.

Referring to FIG. 29, in order to arrange the opposite ends of the connecting plate 501 with the fixing portion 112 to be inclined relative to the horizontal plane, a spacer 1121 may be provided at one end of the fixing portion 112 to elevate the sticking film 200 relative to the surface of the connecting plate 501, so that the sticking film is inclined relative to the connecting plate 501. The thickness of one end of the two ends in the width direction of the connecting plate 501 can also be configured thicker and the other end thereof can be configured thinner, so that after the sticking film 200 is positioned, there is an inclination angle between the sticking film 200 and the screen.

Figure 30:
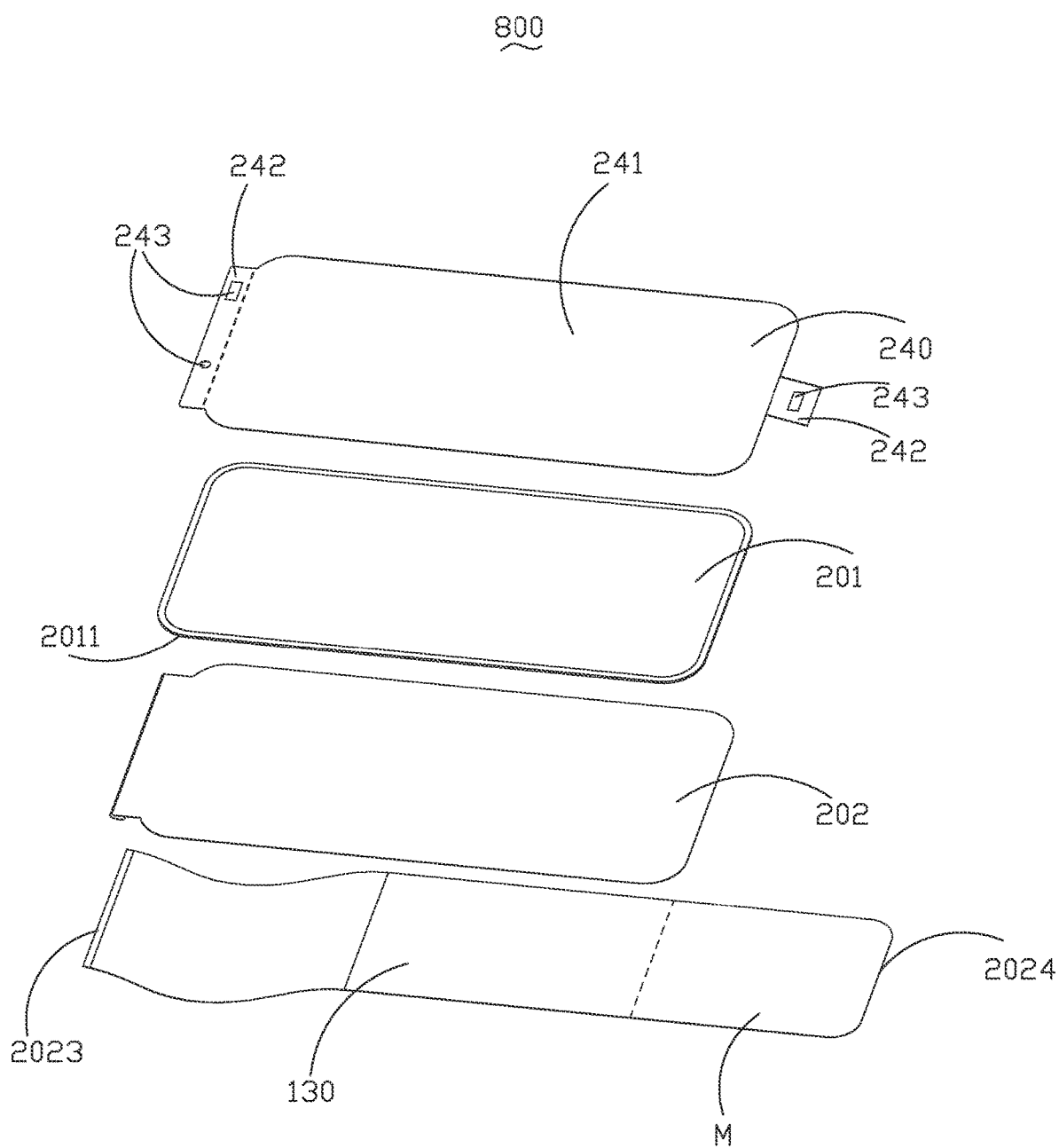
FIG. 30 is an exploded view of a sticking film according to a fourteenth embodiment of the present disclosure.

Referring to FIG. 30, a fourteenth embodiment of the present disclosure provides a sticking film 800, which is used to cooperate with the film applicator of the first embodiment to the thirteenth embodiment to realize the film pasting of electronic equipment. The specific structure thereof is the same as that of the sticking film 200, which is not repeated here.

Figure 31:
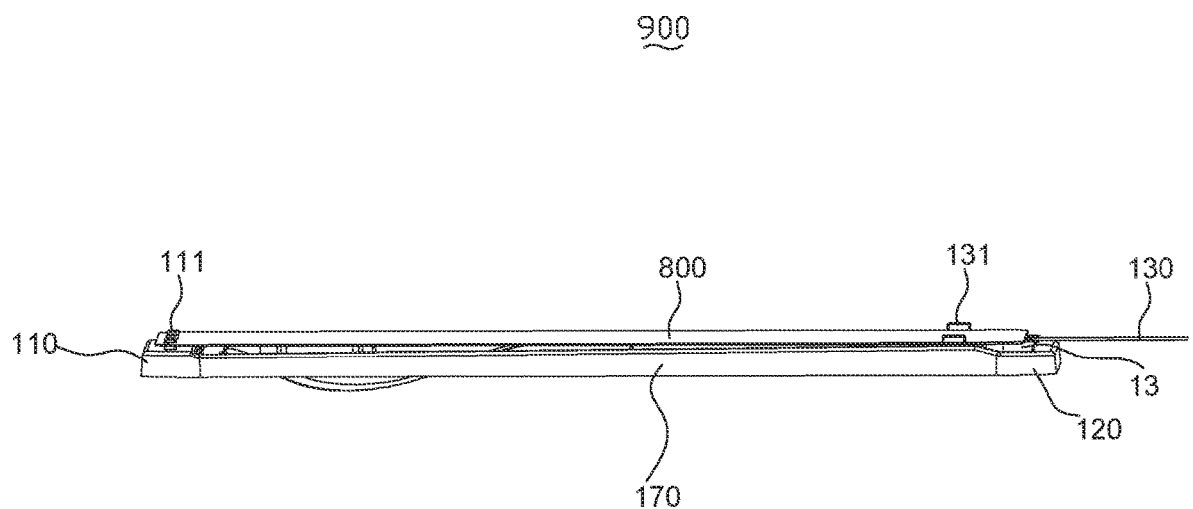
FIG. 31 is a perspective view of a film-sticking assembly according to a fifteenth embodiment of the present disclosure.

Referring to FIG. 31, a fifteenth embodiment of the present disclosure provides a film-sticking assembly 900, which includes any one of the film applicators of the first embodiment to the thirteenth embodiment and the sticking film 800 of the fourteenth embodiment.

The foregoing descriptions are only preferred embodiments of the present disclosure, and should not be construed as limiting the scope of the present disclosure. Any modifications, equivalent replacements and improvements made within the principles of the present disclosure should be included within the protection scope of the present disclosure.

The invention claimed is:
1. A film-sticking assembly, comprising a sticking film and a film applicator, wherein the sticking film comprises a protective film, a tempered film, a release film layer and a pulling portion, the tempered film comprising a sticking surface for sticking to a screen of an electronic product;

the release film layer being attached to the sticking surface of the tempered film, and the release film layer having an electrostatic layer, a gap being defined between the screen and the release film layer;

the pulling portion connected to one end of the release film layer in lengthwise direction; one end of the pulling portion connected to the release film layer being defined as a connecting end, and another end thereof being defined as a free end; the free end extending away from the release film layer attached to the sticking surface of the tempered film;

the film applicator comprising a main body portion with a pulling opening, the main body portion defining a mounting slot for accommodating the electronic product with the screen capable of facing upward, and the main body portion comprising a base and an upper cover, and a fixing portion of the upper cover cooperates with a positioning member of the sticking film to fix the sticking film on the inner side of the upper cover;

the upper cover being recessed toward the base, and a cross-section view of the upper cover cut by a direction perpendicular to the length direction of the upper cover being in the shape of a concave arc; the curvature of the concave arc of the upper cover gradually increasing in the direction from one end to the other end;

the concave upper cover gives a pressure to the sticking film so that the tempered film can be pasted to the screen;

when the concave degree of the upper cover is small, and the pressure applied by the upper cover to the sticking film is small; and when the concave degree of the upper cover is large, and the pressure applied by the upper cover to the sticking film is large, and a larger frictional force can be generated between the release film layer and the screen;

the release film layer is made of a material that is easy to generate static electricity by friction, so that static electricity can be generated when the release film layer and the tempered film are separated;

when the electronic product is positioned in the mounting slot of the main body portion and the sticking film is positioned on the fixing portion of the upper cover which is rotatably connected the base of the main body portion such that the tempered film is arranged above the screen of the electronic product and is close to the sticking surface facing the screen of the electronic product and the pulling portion located between the tempered film and the screen of the electronic product with the free end of the pulling portion extending beyond the main body portion; and upon peeling off the release film layer from the tempered film through pulling the free end of the pulling portion from the pulling opening, the release film layer being positioned between the tempered film and the screen in a curved shape, and a linear movement of the release film layer away from the sticking surface of the tempered film generates static electricity taking away any dust particles attached on the screen of the electronic product.

2. The film-sticking assembly according to claim 1, wherein the tempered film is configured as an antistatic layer.

3. The film-sticking assembly according to claim 1, wherein when the release film layer is torn off, the side of the release film layer in contact with the sticking surface is in natural contact with the screen; or when the release film layer is torn off, the sticking surface of the tempered film being in pressing contact with the screen.

4. The film-sticking assembly according to claim 1, wherein after the electronic product is positioned in the mounting slot and the sticking film is positioned on the fixing portion, two ends of the release film layer in the length direction or in the width direction having a height difference relative to the two opposite ends of the electronic product.

5. The film-sticking assembly according to claim 4, wherein the release film layer is inclined relative to the horizontal plane, and the screen of the electronic product being horizontal relative to the horizontal plane; or the release film layer being horizontal relative to the horizontal plane, and the screen of the electronic product being inclined relative to the horizontal plane.

6. The film-sticking assembly according to claim 1, wherein the main body portion further comprises a substrate; the substrate being accommodated on the base with the mounting slot defined thereon for accommodating the electronic product.

7. The film-sticking assembly according to claim 6, wherein the upper cover comprises a first end and an opposite second end in a length direction or in a width direction, the first end rotatably connected with the base, and the pulling opening being formed by the second end and the base.

8. The film-sticking assembly according to claim 7, wherein the height of the tempered film corresponding to the first end relative to the screen is higher than the height of the tempered film corresponding to the second end relative to the screen.

9. The film-sticking assembly according to claim 8, wherein an observation window is defined on the upper cover extending along the length direction of the upper cover, and the observation window comprising a third end close to the first end of the upper cover and a fourth end close to the second end of the upper cover; the distance between the third end and the first end being S1, the distance between the fourth end with the second end being S2, and S1>S2.

10. The film-sticking assembly according to claim 8, wherein the thickness of the upper cover is smaller than that of the base so that the upper cover being recessed relative to the base.

11. The film-sticking assembly according to claim 1, wherein the main body portion comprises a substrate that comprises a first end wall and an opposite second end wall in the length direction thereof, and two side walls arranged between the first end wall and the second end wall; the first end wall, the second end wall and the two side walls together forming the mounting slot and the pulling opening; one of the first end wall and the second end wall, or one of the two side walls forming the pulling opening, and the fixing portion being provided on the opposite end walls or the two side walls that forms the pulling opening.

12. The film-sticking assembly according to claim 11, wherein the substrate supports the sticking film, and the pulling portion overlapping the upper surface of the first end wall, the second end wall or one of the two side walls that forms the pulling opening.

13. The film-sticking assembly according to claim 12, wherein the pulling opening being formed on the second end wall, the fixing portion is provided on the first end wall and the two side walls, and the heights of the two side walls relative to the horizontal plane gradually increasing from the first end wall to the second end wall; after the sticking film is positioned, there being a height difference between the two ends of the release film layer in the length direction relative to the opposite ends of the electronic product; or, the heights of the side walls relative to the horizontal plane being equal, and the height of the second end wall being lower than that of the first end wall to form the pulling opening.

14. The film-sticking assembly according to claim 13, wherein the end wall or the side wall opposite to the pulling opening defines an avoidance step for providing space for the connection between the release film layer and the pulling portion.

15. The film-sticking assembly according to claim 1, wherein the height of the gap between the screen and the release film layer at the end with the less concave degree is equal to the thickness of the release film layer, and the end with less concave degree of the upper cover is in contact with the sticking film, which also makes the sticking film in contact with the screen.

16. The film-sticking assembly according to claim 1, wherein the upper cover has elasticity, and the pressure applied by the upper cover to the sticking film is a variable elastic force.

* * * * *